(12) United States Patent
Lee et al.

(10) Patent No.: US 10,712,909 B2
(45) Date of Patent: Jul. 14, 2020

(54) METHOD FOR PROVIDING OBJECT INFORMATION AND ELECTRONIC DEVICE THEREOF

(71) Applicant: Samsung Electronics Co., Ltd., Gyeonggi-do (KR)

(72) Inventors: Jae-Wook Lee, Gyeonggi-do (KR); Kyungjung Kim, Gyeonggi-do (KR); Hyungsok Yeo, Gyeonggi-do (KR); Jae-Min Lee, Gyeonggi-do (KR); Eun Jung Hyun, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 177 days.

(21) Appl. No.: 15/810,282

(22) Filed: Nov. 13, 2017

(65) Prior Publication Data

US 2018/0136801 A1    May 17, 2018

(30) Foreign Application Priority Data

Nov. 11, 2016  (KR) ........................ 10-2016-0150155

(51) Int. Cl.
*G06F 3/0482* (2013.01)
*G06F 3/0488* (2013.01)
(Continued)

(52) U.S. Cl.
CPC .......... *G06F 3/0482* (2013.01); *G06F 3/0481* (2013.01); *G06F 3/04886* (2013.01);
(Continued)

(58) Field of Classification Search
CPC .. G06F 3/0482; G06F 3/04886; G06F 3/0481; G06F 3/167
See application file for complete search history.

(56) References Cited

U.S. PATENT DOCUMENTS

| | | | |
|---|---|---|---|
| 8,074,178 B2 | 12/2011 | Hudson | |
| 10,261,672 B1 * | 4/2019 | Dolbakian | .......... G06F 3/04817 |

(Continued)

FOREIGN PATENT DOCUMENTS

| | | |
|---|---|---|
| JP | 2014-179877 A | 9/2014 |
| KR | 1020100131081 A | 12/2010 |

(Continued)

OTHER PUBLICATIONS

International Search Report dated Mar. 8, 2018.

*Primary Examiner* — Shourjo Dasgupta
(74) *Attorney, Agent, or Firm* — Cha & Reiter, LLC.

(57) ABSTRACT

An electronic device and method are disclosed herein. The electronic device includes a processor, a touch screen and a memory including instructions executable by the processor to execute the method, including: when detecting a first touch input to the touch screen, identifying an orientation for arranging a plurality of selectable objects, rearrange one or more objects from among the plurality of selectable objects according to the identified orientation relative to a location on the touch screen where the first touch input is detected, and outputting information associated with a particular object from among the rearranged one or more objects corresponding to detection of a second touch input.

21 Claims, 23 Drawing Sheets

(51) Int. Cl.
   *G06F 3/0481*    (2013.01)
   *G06F 3/16*      (2006.01)
   *G06F 9/451*     (2018.01)
   *G06F 3/041*     (2006.01)

(52) U.S. Cl.
   CPC .............. *G06F 3/167* (2013.01); *G06F 9/451*
              (2018.02); *G06F 3/0412* (2013.01)

(56) References Cited

U.S. PATENT DOCUMENTS

| | | | | |
|---|---|---|---|---|
| 2006/0123357 A1* | 6/2006 | Okamura | ............. | G06F 3/0482 715/786 |
| 2008/0005700 A1* | 1/2008 | Morikawa | ............ | G06F 3/0482 715/841 |
| 2008/0098331 A1* | 4/2008 | Novick | ................ | G06F 3/0233 715/835 |
| 2010/0099464 A1* | 4/2010 | Kim | ...................... | G06F 1/1615 455/566 |
| 2010/0192101 A1* | 7/2010 | Chmielewski | ........ | G06F 3/0482 715/834 |
| 2010/0192102 A1* | 7/2010 | Chmielewski | ...... | G06F 3/04817 715/834 |
| 2011/0187655 A1* | 8/2011 | Min | ..................... | G06F 1/1643 345/173 |
| 2012/0192108 A1* | 7/2012 | Kolb | .................... | G06F 3/0482 715/810 |
| 2012/0249462 A1* | 10/2012 | Flanagan | .............. | G06F 1/1694 345/173 |
| 2012/0284673 A1* | 11/2012 | Lamb | .................. | G06F 3/04883 715/863 |
| 2013/0033483 A1* | 2/2013 | Im | ........................... | G06F 3/017 345/419 |
| 2013/0307801 A1 | 11/2013 | Nam | | |
| 2014/0071063 A1* | 3/2014 | Kuscher | .................. | G06F 3/041 345/173 |
| 2014/0075388 A1* | 3/2014 | Kuscher | ................ | G06F 3/0482 715/834 |
| 2014/0109024 A1* | 4/2014 | Miyazaki | ............. | G06F 3/04883 715/863 |
| 2014/0152586 A1* | 6/2014 | Terunuma | ............. | G06F 3/0482 345/173 |
| 2014/0189552 A1 | 7/2014 | Wang et al. | | |
| 2014/0215329 A1 | 7/2014 | Zilberman et al. | | |
| 2015/0169165 A1* | 6/2015 | Bacus | ................. | G06F 3/04883 715/863 |
| 2015/0277671 A1* | 10/2015 | Nagata | .................. | G06F 3/0482 715/811 |
| 2015/0370427 A1* | 12/2015 | Zhang | ................. | G06F 3/04817 715/835 |
| 2016/0283054 A1* | 9/2016 | Suzuki | .................. | G06F 3/0482 |
| 2017/0193107 A1* | 7/2017 | Imbruce | .................. | G06F 16/9535 |
| 2017/0277367 A1* | 9/2017 | Pahud | .................. | G06F 3/0482 |

FOREIGN PATENT DOCUMENTS

KR    1020140147609 A    12/2014
KR    10-1541928 B1      8/2015

* cited by examiner

METHOD FOR PROVIDING OBJECT INFORMATION AND ELECTRONIC DEVICE THEREOF

CLAIM OF PRIORITY

This application claims priority under 35 U.S.C. § 119(a) to a Korean Patent Application entitled "METHOD FOR PROVIDING OBJECT INFORMATION AND ELECTRONIC DEVICE THEREOF" filed in the Korean Intellectual Property Office on "Nov. 11, 2016" and assigned Serial No. 10-2016-0150155, the contents of which are herein incorporated by reference.

TECHNICAL FIELD

Various example embodiments of the present disclosure relate to an apparatus and method for providing object information in an electronic device.

BACKGROUND

With the growth of information telecommunication technologies and semiconductor technologies, various electronic devices are developing into multimedia devices providing various multimedia services. For example, the multimedia service can include at least one of a voice call service, a message service, a broadcasting service, a wireless Internet service, a camera service, and a music play service.

By using applications installed in the electronic device, the electronic device can provide various services to a user. For example, the application can include at least one of a music application for playing a music source the user desires, a call application for a voice call service, and a camera application for a camera service.

SUMMARY

An electronic device can display, on a display, an application installed in the electronic device in the form of an icon so that a user may identify the application. The electronic device can execute an application corresponding to an icon having been selected by the user among the icons displayed on the display.

The electronic device can provide a service (e.g., talkback) of outputting, by a voice, icon information of a point where a user input (e.g., a touch input) has been detected, so that the user may select an icon of a desired application even when user's visual recognition is impossible. However, when the user of the electronic device fails to recognize an arrangement (i.e., a position) of an icon displayed on a display, an inconvenience can occur in which the user has to search the entire screen of the display one by one in order to find out an icon corresponding to an application that the user intends to execute. Also, when the user of the electronic device recognizes a schematic position of an icon corresponding to a specific application displayed on the display of the electronic device, the user can touch the position that the user has recognized so as to identify a position of the corresponding icon. However, when another icon is positioned in the touch point, the user of the electronic device cannot know whether the icon corresponding to the specific application is positioned in which direction with a criterion of the another icon, so an inconvenience can occur in which the user searches the entire screen of the display one by one.

Various example embodiments of the present disclosure may provide an apparatus and method for providing object information selectable in an electronic device.

Various example embodiments of the present disclosure may provide an apparatus and method for rearranging a region of an object selectable in an electronic device so that a user may easily search the object selectable in the electronic device.

According to various example embodiments of the present disclosure, an electronic device is disclosed including at least one processor, a touch screen, and a memory operatively coupled with the at least one processor, storing instructions executable by the at least one processor to cause the at least one processor to: in response to detecting a first touch input via the touch screen, identify an orientation for arranging a plurality of selectable objects, rearrange one or more objects from among the plurality of selectable objects based on the identified orientation relative to a location on the touch screen where the first touch input is detected, and output information associated with a particular object from among the rearranged one or more objects corresponding to detection of a second touch input.

According to various example embodiments of the present disclosure, an operation method of an electronic device includes in response to detecting a first touch input, identifying an orientation for arranging a plurality of selectable objects, rearranging one or more objects from among the plurality of selectable objects based on the identified orientation relative to a location on the touch screen where the first touch input is detected, and outputting information associated with a particular object from among the rearranged one or more objects corresponding to detection of a second touch input.

DETAILED DESCRIPTION

Figure 1:
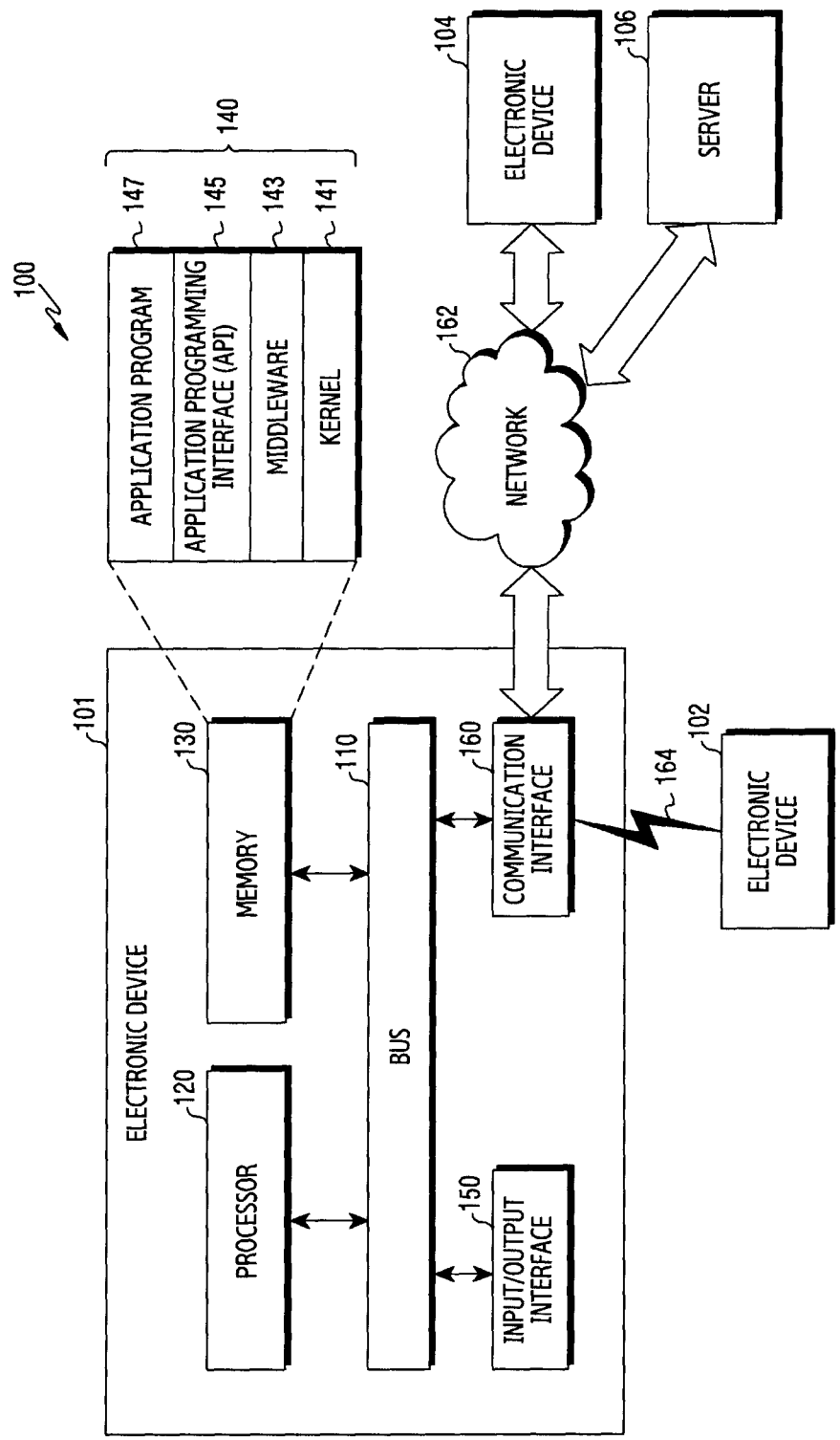
FIG. 1 illustrates an electronic device within a network environment in various example embodiments of the present disclosure.

Hereinafter, various example embodiments of the present document are described with reference to the accompanying drawings. It should be understood, however, that it is not intended to limit the various example embodiments of the present document to the particular form disclosed, but, on the contrary, it is intended to cover all modifications, equivalents, and alternatives falling within the various example embodiments of the present document. Like reference numerals denote like components throughout the drawings. A singular expression includes a plural concept unless there is a contextually distinctive difference therebetween.

In the present document, an expression "A or B", "A and/or B", or the like may include all possible combinations of items enumerated together. Although expressions such as "$1^{st}$", "$2^{nd}$", "first", and "second" may be used to express corresponding constitutional elements, it is not intended to limit the corresponding constitutional elements. When a certain (e.g., $1^{st}$) constitutional element is mentioned as being "operatively or communicatively coupled with/to" or "connected to" a different (e.g., $2^{nd}$) constitutional element, the certain constitutional element is directly coupled with/to another constitutional element or can be coupled with/to the different constitutional element via another (e.g., $3^{rd}$) constitutional element.

An expression "configured to" used in the present document may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device (ex. home appliance) may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates an electronic device 101 within a network environment 100 in various example embodiments of the present disclosure.

Referring to FIG. 1, the electronic device 101 may include a bus 110, a processor 120 (e.g., including processing circuitry), a memory 130, an input output interface 150 (e.g., including input/output circuitry), and a communication interface 160 (e.g., including communication circuitry). In some example embodiment, the electronic device 101 may omit at least one of the constituent elements or additionally have another constituent element.

The bus 110 may, for example, include a circuitry connecting the constituent elements 120 to 160 with one another and forwarding a signal (e.g., a control message and/or data) between the constituent elements.

The processor 120 may include one or more of a central processing unit (CPU), an application processor (AP), a communication processor (CP) or an image signal processor (ISP). The processor 120 may, for example, execute an operation or data processing for control and/or communication of at least one another constituent element of the electronic device 101.

According to an example embodiment, the processor 120 may set a priority of each object for rearranging a plurality of selectable objects based on a user input in the electronic device 101. For example, the processor 120 may extract configuration information of the plurality of selectable objects based on the user input. For instance, the configuration information of the object may include at least one of a layout of the selectable object (e.g., a layout of a service screen including the selectable object), the number of the selectable objects, a position of the object, and/or information of the object (e.g., an icon name and an application name). For example, the processor 120 may set a priority of each object for rearranging the object based on a position of the object, a name of the object or a use history of the object. For instance, the use history of the object may include at least one of the number of use of the object, a use time point thereof, or a use time thereof. For example, when detecting a user input (e.g., touch input) for object rearrangement, the processor 120 may set a priority of each object for rearranging the object with a criterion of a user input point. For instance, the processor 120 may set a priority of each object based on a distance between the user input point and the object. Additionally or alternatively, the processor 120 may set a priority of each object based on the distance between the user input point for a rearrangement direction of the object and the object.

According to an example embodiment, the processor 120 may select at least one object for rearranging among a plurality of selectable objects based on a user input in the electronic device 101. For example, the processor 120 may set the number of objects for rearranging based on at least one of a size of a touch panel (e.g., a display), a position of a reference point, or a use pattern of a user. The processor 120 may select at least one object corresponding to the number of objects for rearranging based on a priority of the object. For example, the processor 120 may select at least one object satisfying a reference condition for selecting the object based on the use pattern of the user. Additionally or alternatively, the processor 120 may set a priority of at least one object for rearranging.

According to an example embodiment, the processor 120 may rearrange at least one object. For example, the processor 120 may rearrange a region corresponding to at least one object in a rearrangement direction from a point where a user input (e.g., touch input) has been detected, based on a priority of the selected at least one object for rearranging among a plurality of objects. For instance, the region corresponding to the object may include a region capable of selecting a corresponding object based on a user input (e.g., touch input). Additionally or alternatively, the processor 120 may control to display identification information of a corresponding object in a region corresponding to a rearranged object, on a display electrically connected with the electronic device 101. For instance, the identification information of the object may include at least one of an icon of the object or a name of the object (i.e., a name of an application corresponding to the object). For instance, the processor 120 may rearrange an object in various forms of at least one straight line, curve, polygon, circle or the like. The at least one straight line may include at least one straight line of the same direction or a mutually different direction with a criterion of a point where a user input (e.g., touch input) has been detected. For instance, a plurality of straight lines of mutually different directions may be arranged in a form in which the respective straight lines intersect such as a cross mark, etc.

According to an example embodiment, the processor 120 may control to output information of an object corresponding to a user input based on a position of the rearranged object. For example, the processor 120 may select an object for outputting object information based on at least one of a point where a touch input of the rearranged object has been detected, a touch holding time, a touch movement direction, or a touch movement distance. The processor 120 may control to output information of an object in the form of a sound, a vibration or the like. Additionally or alternatively, when rearranging an object in a plurality of directions, the processor 120 may determine a direction for searching based on touch movement information. The processor 120 may adjust a selection speed of an object based on an additional input (e.g., pressure intensity) as well.

According to an example embodiment, the processor 120 may execute a function corresponding to an object whose selection input has been detected among a rearranged object. For example, when a first object has been selected among the rearranged object based on a user input, the processor 120 may output information on the first object. When a selection input has been detected in course of outputting the information on the first object, the processor 120 may execute a function corresponding to the first object. For instance, the function corresponding to the first object may include at least one of execution of an application, control menu setting, or control menu execution.

The memory 130 may include a volatile and/or non-volatile memory. The memory 130 may, for example, store a command or data related to at least one another constituent element of the electronic device 101. According to an example embodiment, the memory 130 may store a software and/or program 140. For example, the program 140 may include a kernel 141, a middleware 143, an application programming interface (API) 145, an application program (or "application") 147 or the like. At least some of the kernel 141, the middleware 143, or the API 145 may be called an operating system (OS).

The kernel 141 may, for example, control or manage system resources (e.g., the bus 110, the processor 120, the memory 130 or the like) which are used for executing operations or functions implemented in other programs (e.g., the middleware 143, the API 145, or the application program 147). Also, the kernel 141 may provide an interface capable of controlling or managing the system resources of the electronic device 101 by enabling the middleware 143, the API 145, or the application program 147 to access the individual constituent element of the electronic device 101.

The middleware 143 may, for example, perform a relay role of enabling the API 145 or the application program 147 to communicate and exchange data with the kernel 141. Also, the middleware 143 may process one or more work requests received from the application program 147 according to priority. For example, the middleware 143 may grant at least one of the application programs 147 a priority of utilizing the system resources (e.g., the bus 110, the processor 120, the memory 130, etc.) of the electronic device 101, and process the one or more work requests. The API 145 is, for example, an interface enabling the application program 147 to control a function provided by the kernel 141 or the middleware 143 and may, for example, include at least one interface or function (e.g., instruction) for file control, window control, image processing, character control or the like.

The input output interface 150 may, for example, play a role of an interface capable of forwarding a command or data inputted from a user or another external device to the other constituent element(s) of the electronic device 101.

According to an example embodiment, the input output interface 150 may include a touch panel and a pressure panel. For example, the input output interface 150 may receive a touch, gesture, proximity or hovering input utilizing an electronic pen or a part of the user's body, through the touch panel. For example, the input output interface 150 may, through the pressure panel, receive a pressure input of a part of the user's human body or a nonconductor.

The communication interface 160 may, for example, establish communication between the electronic device 101 and an external device (e.g., a first external electronic device 102 by networking 164, a second external electronic device 104, or a server 106). For example, the communication interface 160 may be connected to a network 162 by a wireless communication or wired communication, to communicate with the external device (e.g., the second external electronic device 104 or the server 106).

The wireless communication may, for example, include a cellular communication that utilizes at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) or the like. According to an example embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF), or body area network (BAN). According to an example embodiment, the wireless communication may include GNSS. The GNSS may, for example, be a global positioning system (GPS), a global navigation satellite system (Glonass), Beidou (Beidou navigation satellite system), or Galileo (the European global satellite-based navigation system). Below, in the present document, the "GPS" may be used interchangeably with the "GNSS". The wired communication may, for example, include at least one of a universal serial bus (USB), a high definition multimedia interface (HDMI), recommended standard-232 (RS-232), power line communication, plain old telephone service (POTS) or the like. The network 162 may include a telecommunications network, for example, at least one of a computer network (e.g., local area network (LAN) or wide area network (WAN)), the Internet, or a telephone network.

The first and second electronic devices 102 and 104 each may be a device of the same or different type from that of the electronic device 101. According to various example embodiments, all or some of operations executed in the electronic device 101 may be executed in another or a plurality of electronic devices (e.g., the electronic devices 102 and 104 or the server 106). According to an example embodiment, when the electronic device 101 has to perform some function or service automatically or by a request, the electronic device 101 may, instead of or additionally to executing the function or service in itself, request at least a partial function associated with this to another device (e.g., the electronic devices 102 and 104 or the server 106). The another electronic device (e.g., the electronic devices 102 and 104 or the server 106) may execute the requested function or additional function, and forward the execution result to the electronic device 101. The electronic device 101 may process the received result as it is or additionally, thereby providing the requested function or service. For this, a cloud computing, distributed computing, or client-server computing technology may be used, for example.

According to various example embodiments of the present disclosure, the electronic device 101 may further include a display capable of displaying various contents (e.g., a text, an image, a video, an icon, a symbol and/or the like) to a user. For example, the display may include a liquid crystal display (LCD), a light emitting diode (LED) display, an organic light emitting diode (OLED) display, a microelectromechanical systems (MEMS) display, or an electronic paper display.

Figure 2:
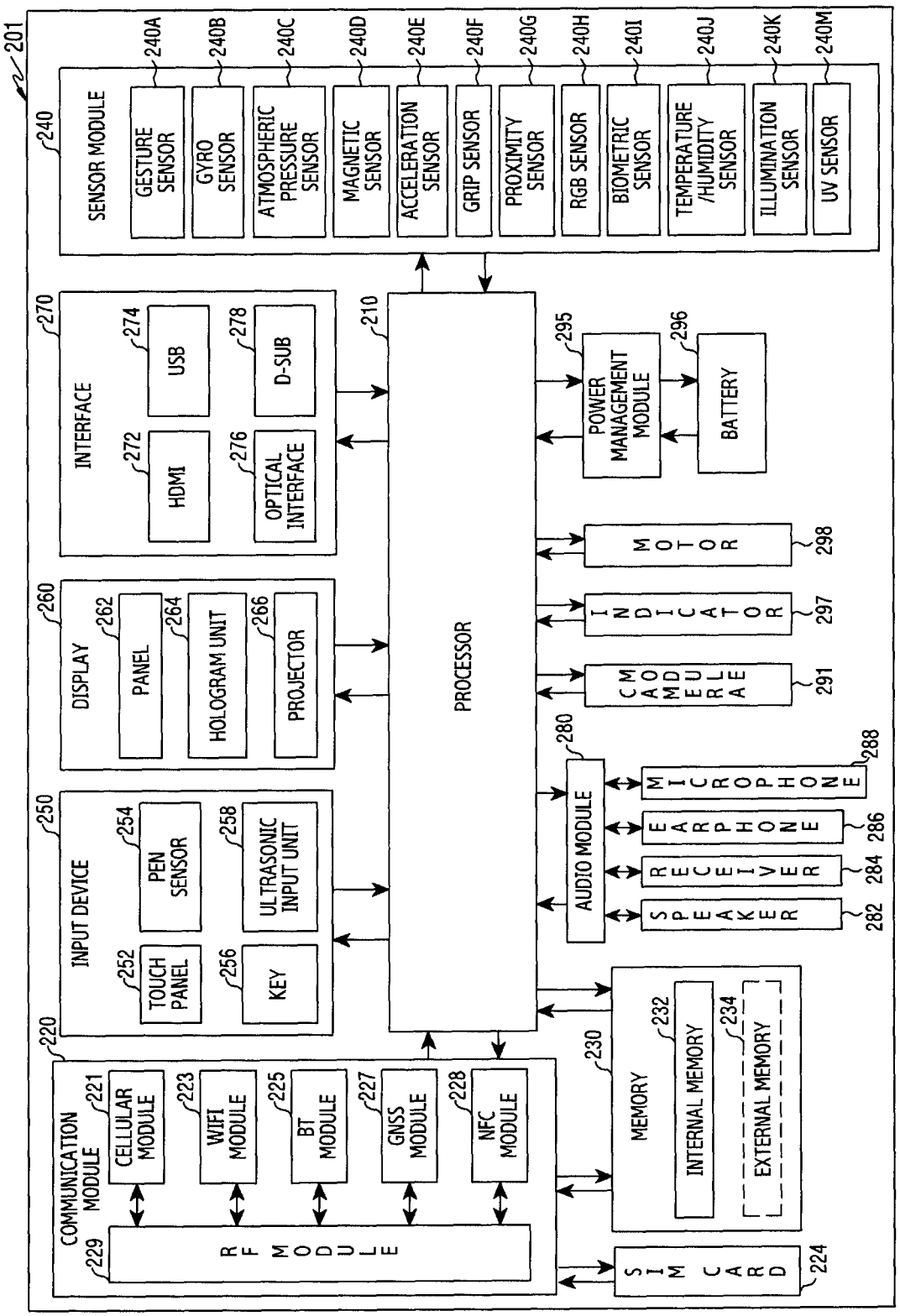
FIG. 2 illustrates a block diagram of an electronic device according to various example embodiments of the present disclosure.

FIG. 2 illustrates a block diagram of an electronic device 201 according to various example embodiments. The electronic device 201 may, for example, include the entire or part of the electronic device 101 illustrated in FIG. 1. The electronic device 201 may include one or more processors (e.g., an AP) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may, for example, operate an operating system or an application program, to control a plurality of hardware or software constituent elements connected to the processor 210, and may perform various data processing and operations. The processor 210 may be, for example, implemented as a system on chip (SoC). According to an example embodiment, the processor 210 may further include a graphic processing unit (GPU) and/or an image signal processor (ISP). The processor 210 may include at least some (e.g., cellular module 221) of the constituent elements shown in FIG. 2 as well. The processor 210 may load, to a volatile memory, a command or data received from at least one of the other constituent elements (e.g., non-volatile memory) and process the loaded command or data, and may store the result data in the non-volatile memory.

According to an example embodiment, the processor 210 may rearrange a plurality of objects selectable in the electronic device 201. The processor 210 may control to output information of an object corresponding to a user input based on a position of the rearranged object. The processor 210 may execute a function corresponding to an object whose selection input has been detected among the rearranged object.

The communication module 220 may have the same or similar construction with the communication interface 160 of FIG. 1. The communication module 220 may, for example, include a cellular module 221, a WiFi module 223, a Bluetooth module 225, a GNSS module 227, a NFC module 228, and a RF module 229.

The cellular module 221 may, for example, provide a voice call, a video call, a text service, an Internet service or the like through a telecommunication network. According to an example embodiment, the cellular module 221 may perform the distinction and authentication of the electronic device 201 within the telecommunication network by using the subscriber identification module (e.g., SIM card) 224. According to an example embodiment, the cellular module 221 may perform at least some functions among functions that the processor 210 may provide. According to an example embodiment, the cellular module 221 may include a communication processor (CP).

According to some example embodiment, at least some (e.g., two or more) of the cellular module 221, the WiFi module 223, the Bluetooth module 225, the GNSS module 227 or the NFC module 228 may be included within one integrated chip (IC) or IC package.

The RF module 229 may, for example, transmit and/or receive a communication signal (e.g., a RF signal). The RF module 229 may, for example, include a transceiver, a power amplifier module (PAM), a frequency filter, a low noise amplifier (LNA), an antenna or the like. According to another example embodiment, at least one of the cellular module 221, the WiFi module 223, the Bluetooth module 225, the GNSS module 227 or the NFC module 228 may transmit and/or receive a RF signal through a separate RF module. The subscriber identification module 224 may, for example, include a card including a subscriber identification module, or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., the memory 130 of FIG. 1) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like), and/or a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive, or a solid state drive (SSD)). The external memory 234 may include a flash drive, for example, a compact flash (CF), a secure digital (SD), a micro-SD, a mini-SD, an extreme digital (xD), a multimedia card (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G a color sensor 240H (e.g., a red, green, blue (RGB) sensor), a medical sensor 240I, a temperature-humidity sensor 240J, an illumination sensor 240K, or an ultra violet (UV) sensor 240M. Additionally or alternatively, the sensor module 240 may, for example, include an e-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuitry for controlling at least one or more sensors belonging therein. In some example embodiment, the electronic device 201 may further include a processor configured to control the sensor module 240 as a part of the processor 210 or separately, to control the sensor module 240 while the processor 210 is in a sleep state.

The input device 250 may, for example, include a touch panel 252, a (digital) pen sensor 254, a key 256, or an ultrasonic input device 258. The touch panel 252 may, for example, use at least one scheme among a capacitive overlay scheme, a pressure sensitive scheme, an infrared beam scheme, or an ultrasonic scheme. Also, the touch panel 252 may further include a control circuitry as well. The touch panel 252 may further include a tactile layer, to provide a tactile response (i.e., a touch coordinate) to a user. The (digital) pen sensor 254 may, for example, be a part of the touch panel 252, or include a separate sheet for recognition. The key 256 may, for example, include a physical button, an optical key, or a keypad. The ultrasonic input device 258 may detect an ultrasonic wave generated in an input tool through a microphone (e.g., a microphone 288), to identify data corresponding to the detected ultrasonic wave.

The display 260 may include a panel 262, a hologram device 264, a projector 266, and/or a control circuitry for controlling them. The panel 262 may, for example, be implemented to be flexible, transparent, or wearable. The panel 262 may be configured as one or more modules with the touch panel 252. According to an example embodiment, the panel 262 may include a pressure sensor (or force sensor) capable of measuring pressure information (e.g., a pressure coordinate and a pressure intensity) of a user's touch. The pressure sensor may be implemented integrally with the touch panel 252, or be implemented as one or more sensors separate from the touch panel 252. The hologram device 264 may show a three-dimensional image to the air by using the interference of light. The projector 266 may display an image by projecting light onto a screen. The screen may, for example, be disposed inside or outside the electronic device 201. The interface 270 may, for example, include an HDMI 272, a USB 274, an optical interface 276, or a D-subminiature (D-sub) 278. The interface 270 may, for example, be included in the communication interface 160 illustrated in FIG. 1. Additionally or alternatively, the interface 270 may, for example, include a mobile high-definition link (MHL) interface, an SD card/multi-media card (MMC) interface, or an infrared data association (IrDA) standard interface.

The audio module 280 may, for example, convert a sound and an electrical signal interactively. At least some constituent elements of the audio module 280 may, for example, be included in the input output interface 150 illustrated in FIG. 1. The audio module 280 may, for example, process sound information that is inputted or outputted through a speaker 282, a receiver 284, an earphone 286, the microphone 288 or the like. The camera module 291 may be, for example, a device able to capture a still image and a video image. According to an example embodiment, the camera module 291 may include one or more image sensors (e.g., a front sensor or rear sensor), a lens, an image signal processor (ISP), or a flash (e.g., a LED, a xenon lamp or the like). The power management module 295 may, for example, manage power of the electronic device 201. According to an example embodiment, the power management module 295 may include a power management integrated circuit (PMIC), a charger IC, or a battery or fuel gauge. The PMIC may employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuitry for wireless charging, for example, a coil loop, a resonance circuitry, a rectifier or the like. The battery gauge may, for example, measure a level of the battery 296, a voltage in charge thereof, an electric current thereof or a temperature thereof. The battery 296 may, for example, include a rechargeable battery and/or a solar battery.

The indicator 297 may display a specific state (for example, a booting state, a message state, a charging state or the like) of the electronic device 201 or a part (e.g., the processor 210) of the electronic device 201. The motor 298 may convert an electrical signal into a mechanical vibration, and may generate a vibration, a haptic effect or the like. The electronic device 201 may, for example, include a mobile TV support device (e.g., a GPU) capable of processing media data in compliance with the standards such as digital multimedia broadcasting (DMB), digital video broadcasting (DVB), mediaFlo™ or the like. The constituent elements depicted in the present document may each include one or more components, and a name of the corresponding constituent element may be different according to the kind of an electronic device. In various example embodiments, the electronic device (e.g., the electronic device 201) may omit some constituent elements, or further include additional constituent elements, or combine and configure some of the constituent elements as one entity, wherein the configured entity may identically perform functions of the corresponding constituent elements before combination.

Figure 3:
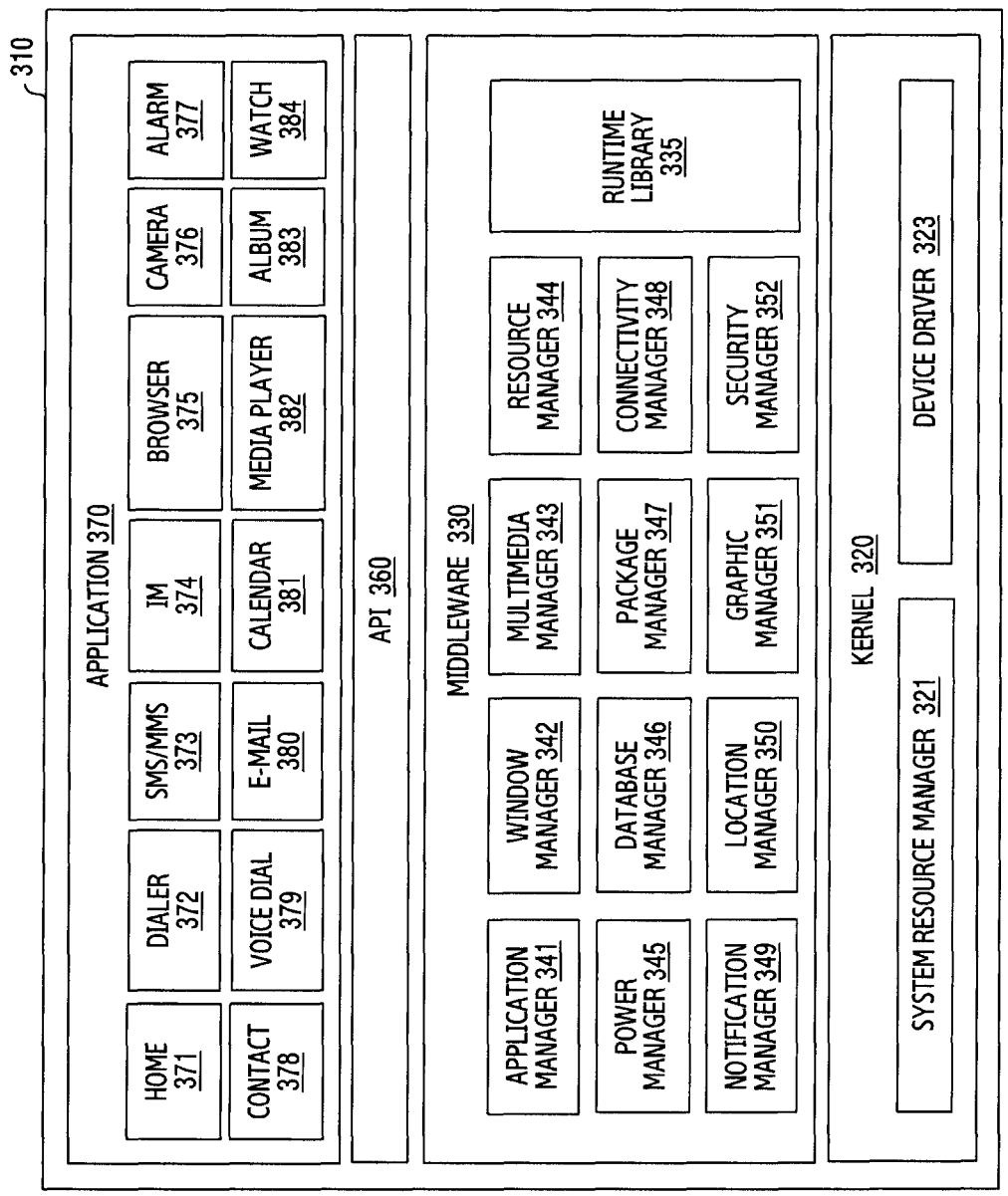
FIG. 3 illustrates a block diagram of a program module according to various example embodiments of the present disclosure.

FIG. 3 illustrates a block diagram of a program module according to various example embodiments. According to one example embodiment, the program module 310 (e.g., the program 140 of FIG. 1) may include an operating system (OS) controlling resources related to an electronic device (e.g., the electronic device 101 of FIG. 1) and/or various applications (e.g., the application program 147 of FIG. 1) run on the operating system. The operating system may, for example, include Android™, iOS™, Windows™, Symbian™, Tizen™, or Bada™.

Referring to FIG. 3, the program module 310 may include a kernel 320 (e.g., the kernel 141 of FIG. 1), a middleware 330 (e.g., the middleware 143 of FIG. 1), an API 360 (e.g., the API 145 of FIG. 1), and/or an application 370 (e.g., the application program 147 of FIG. 1). At least some of the program module 310 may be preloaded onto an electronic device, or be downloaded from an external electronic device (e.g., the electronic devices 102 and 104, the server 106, etc. of FIG. 1).

The kernel 320 may, for example, include a system resource manager 321 and/or a device driver 323. The system resource manager 321 may perform control of a system resource, allocation thereof, or recovery thereof. According to an example embodiment, the system resource manager 321 may include a process management unit, a memory management unit, or a file system management unit. The device driver 323 may, for example, include a display driver, a camera driver, a Bluetooth driver, a shared memory driver, a USB driver, a keypad driver, a WiFi driver, an audio driver, a touch device driver, a pressure device driver, or an inter-process communication (IPC) driver.

The middleware 330 may, for example, provide a function that the application 370 commonly needs, or provide various functions to the application 370 through the API 360 so that the application 370 may make use of restricted system resources within an electronic device. According to an example embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may, for example, include a library module that a compiler utilizes so as to add a new function through a programming language while the application 370 is executed. The runtime library 335 may perform input output management, memory management, or arithmetic function processing. The application manager 341 may, for example, manage a lifecycle of the application 370. The window manager 342 may manage a GUI resource which is used for a screen. The multimedia manager 343 may grasp a format for playing media files, and perform encoding or decoding of the media file by using a codec suitable to the corresponding format. The resource manager 344 may manage a source code of the application 370 or a space of a memory. The power manager 345 may, for example, manage a battery capacity or power source, and provide power information utilized for an operation of an electronic device. According to an example embodiment, the power manager 345 may interwork with a basic input/output system (BIOS). The database manager 346 may, for example, generate, search or change a database that will be used in the application 370. The package manager 347 may manage the installing or updating of an application that is distributed in the form of a package file.

The connectivity manager 348 may, for example, manage wireless connectivity. The notification manager 349 may, for example, provide an event such as an arrival message, an appointment, a proximity notification, etc. to a user. The location manager 350 may, for example, manage location information of an electronic device. The graphic manager 351 may, for example, manage a graphic effect that will be provided to a user, or a user interface related with this. The security manager 352 may, for example, provide system security or user authentication. According to an example embodiment, the middleware 330 may include a telephony manager for managing a voice or video call function of an electronic device, or a middleware module capable of forming a combination of functions of the aforementioned constituent elements. According to an example embodiment, the middleware 330 may provide a module specialized by type of an operating system. The middleware 330 may dynamically delete some of the existing constituent elements, or add new constituent elements. The API 360 is, for example, a set of API programming functions, and may be provided to have another construction in accordance with an operating system. For example, Android or iOS may provide one API set on a per-platform basis, and Tizen may provide two or more API sets on a per-platform basis.

The application 370 may, for example, include a home 371, a dialer 372, a short message service (SMS)/multimedia message service (MMS) 373, an instant message (IM) 374, a browser 375, a camera 376, an alarm 377, a contact 378, a voice dial 379, an electronic mail (e-mail) 380, a calendar 381, a media player 382, an album 383, a watch 384, a health care (e.g., measuring a momentum, a blood sugar or the like), or an environment information (e.g., air pressure, humidity, or temperature information) provision application. According to an example embodiment, the application 370 may include an information exchange application that may support information exchange between an electronic device and an external electronic device. The information exchange application may, for example, include a notification relay application for relaying specific information to the external electronic device, or a device management application for managing the external electronic device. For example, the notification relay application may relay, to the external electronic device, notification information generated from another application of the electronic device, or receive notification information from the external electronic device and provide the received notification information to a user. The device management application may, for example, install, delete, or update a function of the external electronic device (e.g., turn-on/turn-off of the external electronic device itself (or some constituent components) or adjustment of a display brightness (or resolution)) which communicates with the electronic device, or an application which operates in the external electronic device. According to an example embodiment, the application 370 may include an application (e.g., a health care application of a mobile medical instrument) designated according to an attribute of the external electronic device. According to an example embodiment, the application 370 may include an application received from the external electronic device. At least a part of the program module 310 may be implemented (e.g., executed) as software, firmware, hardware (e.g., the processor 210), or a combination of at least two or more of them, and may include a module for performing one or more functions, a program, a routine, sets of instructions or a process.

According to various example embodiments of the present disclosure, an electronic device may include at least one processor, a touch screen and a memory operatively coupled with the at least one processor. The memory may store instructions executable by the at least one processor to cause the at least one processor to: in response to detecting a first touch input via the touch screen, identify an orientation for arranging a plurality of selectable objects, rearrange one or more objects from among the plurality of selectable objects based on the identified orientation relative to a location on the touch screen where the first touch input is detected, and output information associated with a particular object from among the rearranged one or more objects corresponding to detection of a second touch input.

According to various example embodiments, the rearranging the one or more objects further comprise: rearranging one or more regions, each region corresponding to each of the rearranged one or more objects, the one or more of regions rearranged according to the identified orientation relative to the location.

According to various example embodiments, the instructions further comprise setting a priority for each one or more objects, and wherein the one or more objects are further rearranged based on the set priorities of the objects.

According to various example embodiments, the priority of each of the objects is based on at least one of an arrangement of each object, a name of each object, a usage history for each object, and a distance between the location and each object.

According to various example embodiments, the instructions further comprise detecting an object having a highest priority, and wherein the orientation is identified based on a position of the detected object relative to the location where the first touch input is detected.

According to various example embodiments, the rearrangement comprises a menu in a form of at least one of a column, a row, a curve, a polygon or a circle.

According to various example embodiments, the instructions further comprise: in response to detect holding of the second touch input, switching selection of a present object to a next object within the rearranged one or more objects when a predetermined time lapses; and outputting information associated with the next object.

According to various example embodiments, the instructions further comprise: selecting a particular object of the rearranged one or more objects, responsive to detecting movement of the second touch input in a particular direction; and outputting information associated with the selected particular object.

According to various example embodiments, the outputting the information associated with the particular object includes output of at least one of a sound and a vibration.

According to various example embodiments, the instructions further comprise: in response to detecting the second touch input selecting the particular object, executing a function corresponding to the particular object.

Figure 4:
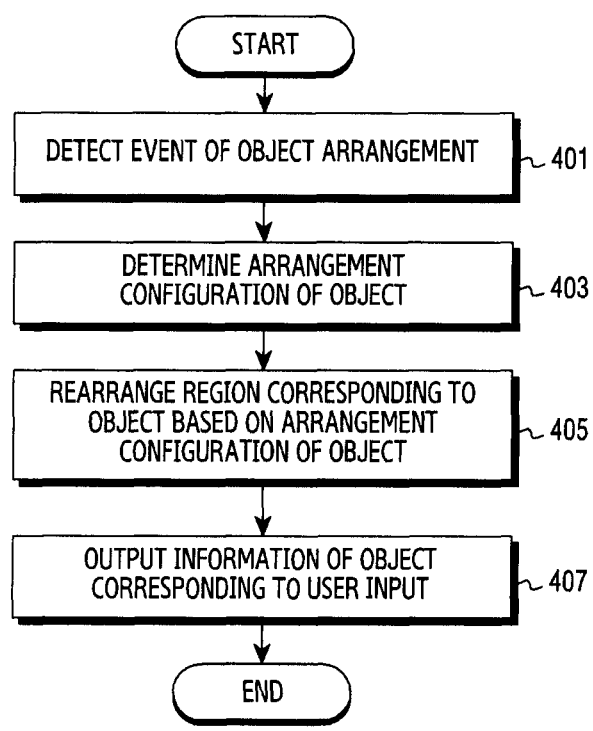
FIG. 4 illustrates a flowchart for outputting object information in an electronic device according to various example embodiments of the present disclosure.

FIG. 4 illustrates a flowchart for outputting object information in an electronic device according to various example embodiments of the present disclosure. In the following description, the electronic device may include the electronic device 101 of FIG. 1 or at least a part (e.g., the processor 120) of the electronic device 101.

Referring to FIG. 4, in operation 401, the electronic device may detect the occurrence of an event for object arrangement. For example, the processor 120 may detect a touch input corresponding to the event for object arrangement is. For instance, the processor 120 may detect whether the touch input corresponds to the event for executing object arrangement is detected based on at least one of the number of times of touch input, a touch holding time, a touch point, or a touch movement distance. For example, when a menu for object arrangement has been set, the processor 120 may detect whether a touch input to a display region (e.g., a touch region overlapped with the display region) of the electronic device 101 is detected. When detecting the touch input to the display region of the electronic device 101, the processor 120 may determine that a request for object arrangement has been received.

In operation 403, the electronic device may determine an arrangement configuration for rearranging an object. For example, the processor 120 may identify a direction for rearranging an object stored in the memory 130, and a rearrangement form. Additionally or alternatively, the processor 120 may update the direction for rearranging the object with a criterion of a detection point of the touch input corresponding to the event for object arrangement as well. For instance, when the direction for rearranging the object has been set as an up direction from a reference point but the touch input corresponding to the event for object arrangement has been detected at an upper end of the display region, the processor 120 may change the direction for rearranging the object into another direction (e.g., a down direction).

In operation 405, the electronic device may rearrange the object based on the determined arrangement configuration. For example, the processor 120 may set a priority of selectable at least one object with a criterion of the detection point of the touch input corresponding to the event for object arrangement. The processor 120 may rearrange a region corresponding to each object in the rearrangement direction from the detection point of the touch input corresponding to the event for object arrangement according to the priority of the object. That is, the processor 120 may maintain the arrangement of the selectable at least one object, by rearranging a region capable of selecting each object, not each object themselves.

In operation 407, the electronic device may output information for the object corresponding to the user input based on a position of the rearranged object. For example, the processor 120 may select any one object corresponding to the user input in an object rearrangement structure. The processor 120 may control to output the information of the object (e.g., a name of the object) by using at least one output scheme among a sound or vibration. For instance, the user input may include at least one of a point where a touch input has been detected, a touch holding time, a touch movement direction, or a touch movement distance.

According to various example embodiments of the present disclosure, the electronic device 101 may display information of the rearranged object on a display electrically connected with the electronic device 101. For example, the processor 120 may control the display to display the information of the rearranged object in the form of an icon or text. The display may display the information of the rearranged object to overlap with a service screen. In this case, the display may display the information of the rearranged object, by using another display layer arranged on a display layer displaying the service screen.

Figure 5:
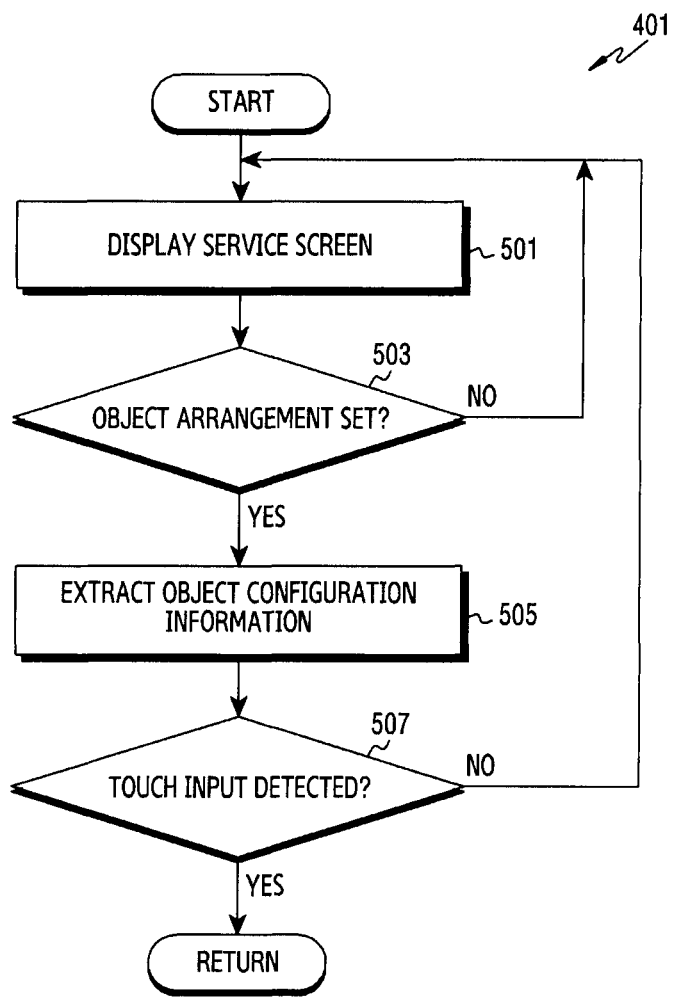
FIG. 5 illustrates an example of a flowchart for extracting object information in an electronic device according to various example embodiments of the present disclosure.

FIG. 5 illustrates an example of a flowchart for extracting object information in an electronic device according to various example embodiments of the present disclosure. The following description is made for an operation for detecting the occurrence of the event for object arrangement in operation 401 of FIG. 4. In the following description, the electronic device may include the electronic device 101 of FIG. 1 or at least a part (e.g., the processor 120) of the electronic device 101.

Referring to FIG. 5, in operation 501, the electronic device may display a service screen on a display of the electronic device. For example, when detecting a selection input of a power button or home button, the processor 120 may control the display electrically connected with the electronic device 101 to display a service screen of an application being executed in the electronic device 101.

In operation 503, the electronic device may determine whether a control menu (e.g., a selectable option within a greater menu) for object arrangement has been set. For example, the processor 120 may determine whether the control menu corresponding to the object rearrangement among a menu for setting a control function of the electronic device 101 has been activated.

When the control menu for the object arrangement has not been set, the electronic device may determine not to perform object rearrangement. Accordingly, the electronic device may maintain display of the service screen in operation 501. For example, the electronic device 101 may update the service screen based on input information received through the input output interface 150 in operation 501.

In operation 505, when the control menu for the object arrangement has been set, the electronic device may extract configuration information of at least one object selectable in the electronic device. For example, by analyzing the service screen displayed on the display, the processor 120 may extract at least one of a layout of the at least one object selectable in the service screen, the number of the objects selectable in the service screen, and/or object information (e.g., an icon name and/or an application name).

In operation 507, the electronic device may determine whether a touch input is detected. For example, when the touch input is detected to the service screen in a state in which the control menu for object arrangement has been set, the processor 120 may determine that an event requesting object arrangement has occurred. For example, when the touch input is not detected, in operation 501, the processor 120 may maintain the displaying of the service screen displayed on the display. Additionally or alternatively, in operation 501, the processor 120 may control the display to update the service screen based on a user input as well.

Figure 6:
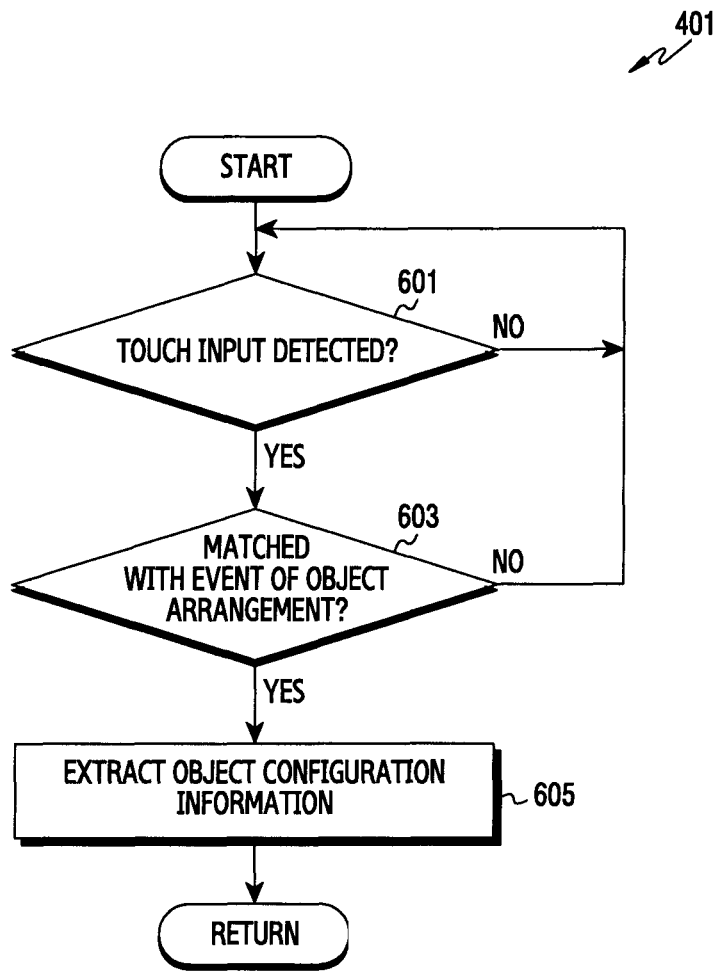
FIG. 6 illustrates another example of a flowchart for extracting object information in an electronic device according to various example embodiments of the present disclosure.

FIG. 6 illustrates another example of a flowchart for extracting object information in an electronic device according to various example embodiments of the present disclosure. The following description is made for an operation for detecting the occurrence of an event for object arrangement in operation 401 of FIG. 4. In the following description, the electronic device may include the electronic device 101 of FIG. 1 or at least a part (e.g., the processor 120) of the electronic device 101.

Referring to FIG. 6, in operation 601, the electronic device may determine whether a touch input is detected. For example, the processor 120 may determine whether the touch input is detected through a touch panel. For instance, the processor 120 may determine whether the touch input is detected in a state in which a display panel overlapping with the touch panel has been activated or deactivated.

In operation 603, the electronic device may detected whether the touch input is corresponds with an event requesting object arrangement. For example, the processor 120 may determine whether the touch input is matched with the event for object arrangement based on at least one of a detection point of the touch input, a holding time thereof, or the number of times of input thereof.

When the touch input is not matched with the event for object arrangement, the electronic device may determine that the event for object arrangement has not occurred. Accordingly to this, in operation 601, the electronic device may again determine whether the touch input is detected.

When the touch input is matched with the event for object arrangement, the electronic device may determine that the event for object arrangement has occurred. According to this, in operation 605, the electronic device may extract configuration information of each object selectable in the electronic device. For example, the processor 120 may analyze a service screen displayable on the display of the electronic device 101, and extract at least one configuration information selectable in the service screen. For example, when the display has been deactivated (e.g., low power mode), the processor 120 may analyze a reference service screen, and extract at least one configuration information which is selectable in the reference service screen. For instance, the configuration information of the object may include at least one of a layout of at least one object, the number of the objects, a position of the object, and/or information of the object (e.g., an icon name and/or an application name). The reference service screen may include a service screen for displaying on a display at a time point when the display is activated, or a predetermined fixed service screen.

Figure 7:
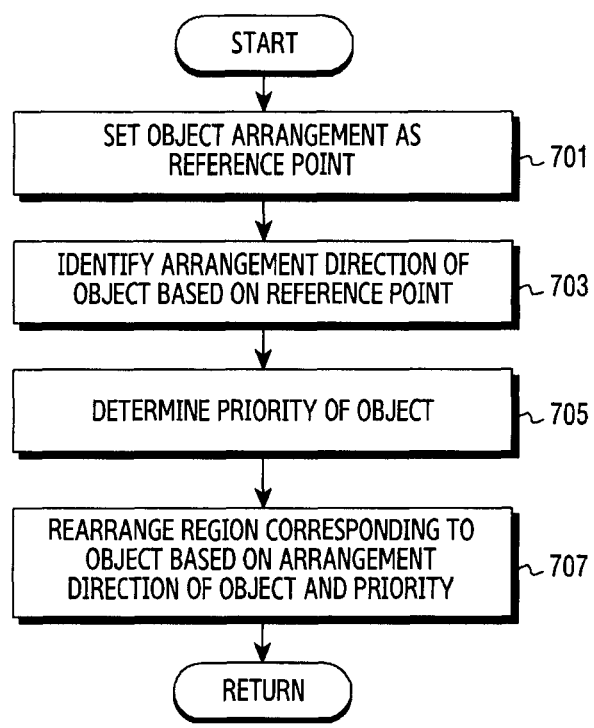
FIG. 7 illustrates a flowchart for rearranging an object in an electronic device according to various example embodiments of the present disclosure.
Figure 8A:
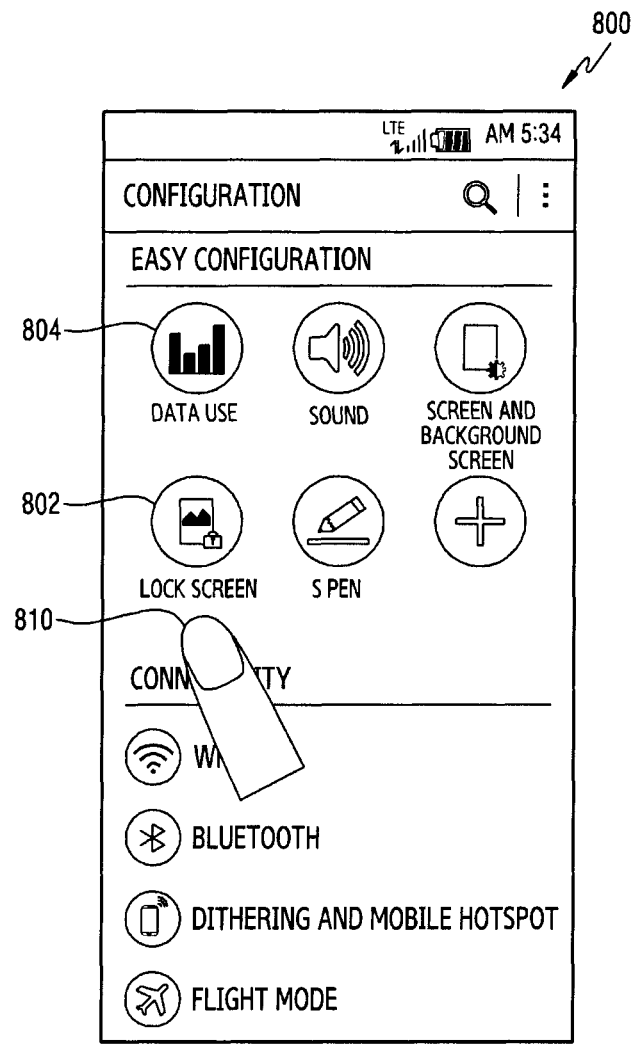
FIG. 8A, FIG. 8B, FIG. 8C and FIG. 8D illustrate a configuration for rearranging an object in the form of a straight line according to various example embodiments of the present disclosure.
Figure 8B:
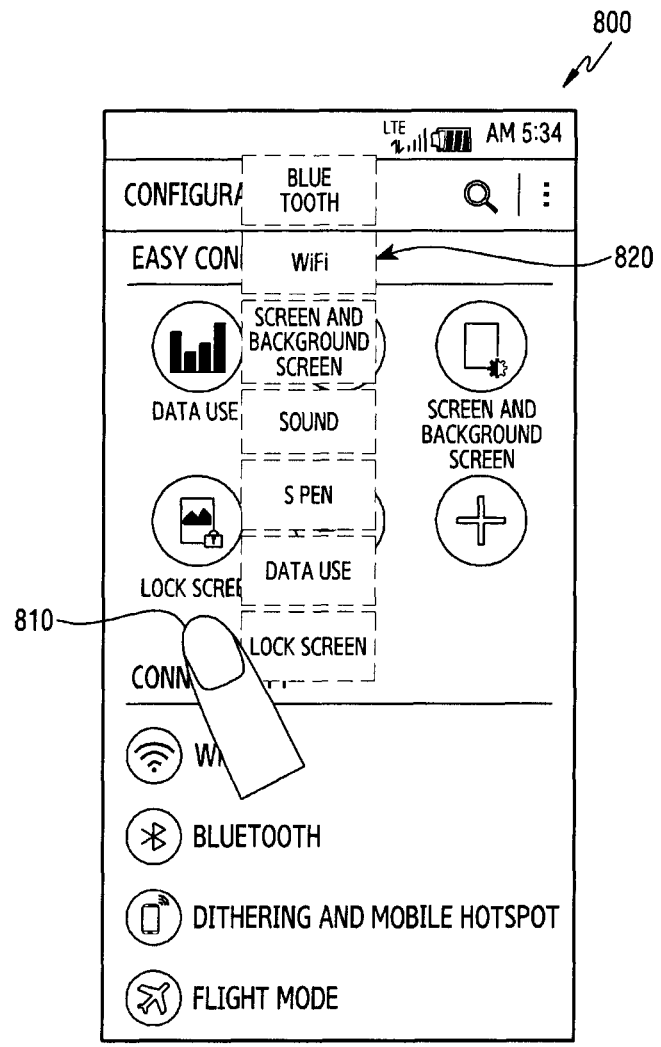
Figure 8C:
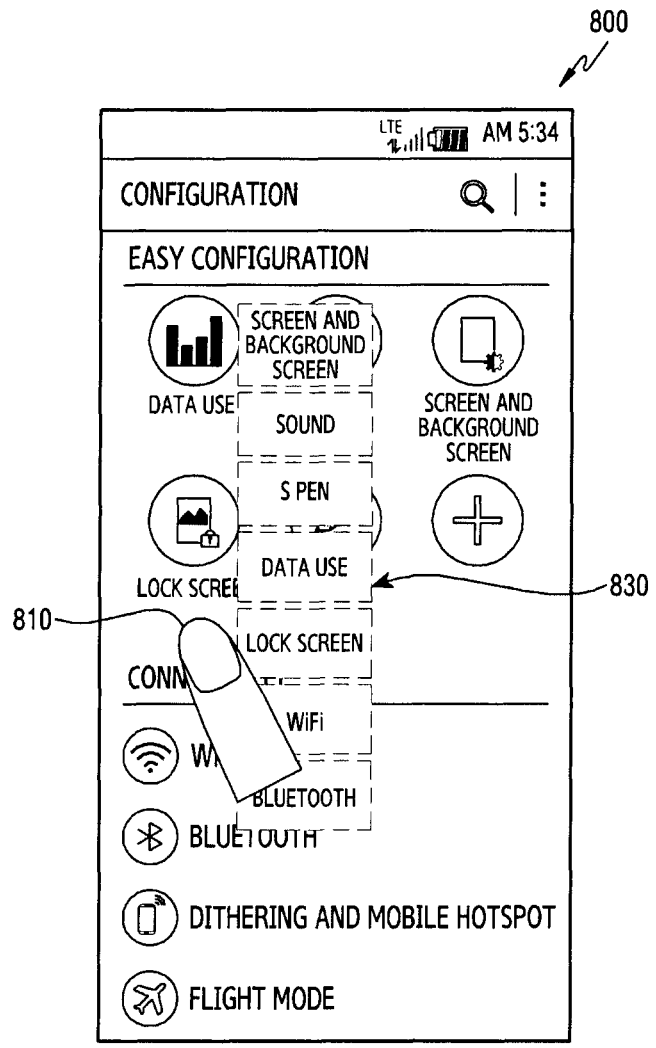
Figure 8D:
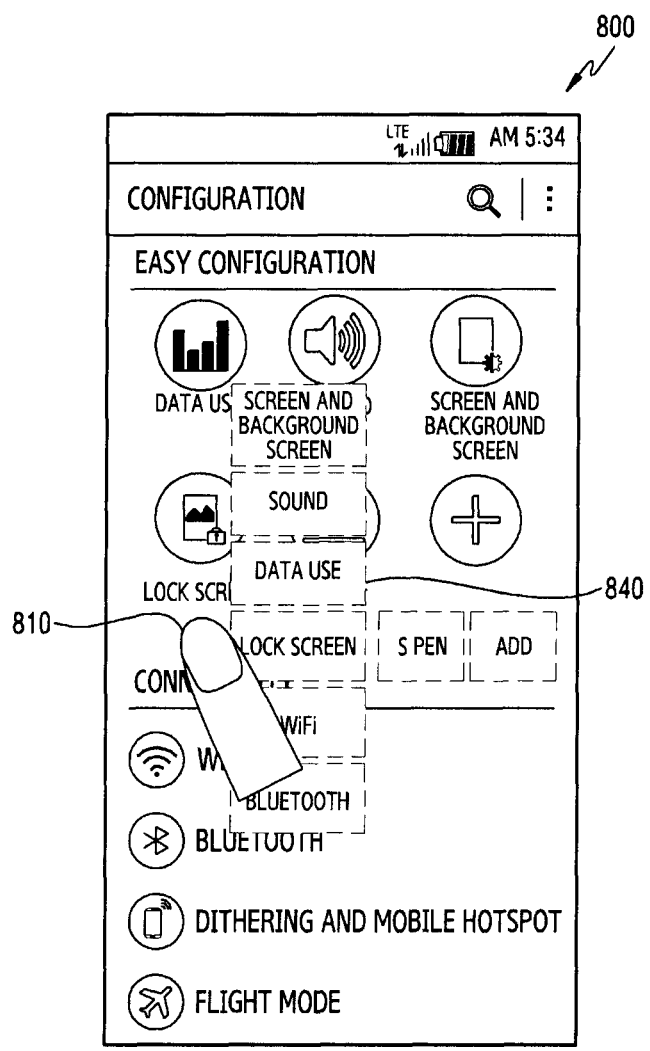

FIG. 7 illustrates a flowchart for rearranging an object in an electronic device according to various example embodiments of the present disclosure. FIGS. 8A to 8D illustrate a configuration for rearranging the object in the form of a straight line according to various example embodiments of the present disclosure. The following description is made for an operation for rearranging the object in operation 403 to operation 405 of FIG. 4. In the following description, the electronic device may include the electronic device 101 of FIG. 1 or at least a part (e.g., the processor 120) of the electronic device 101.

Referring to FIG. 7, in operation 701, when an event for object arrangement takes place (e.g., operation 401 of FIG. 4), the electronic device may set a reference point for rearranging an object. For example, as in FIG. 8A, when detecting the occurrence of the event for object arrangement based on a touch input to a service screen 800 displayable on a display of the electronic device 101, the processor 120 may set a point 810 where the touch input is detected as the reference point for rearranging the object. Additionally or alternatively, the processor 120 may set, as the reference point, an object (e.g., a lock screen object 802) which is most adjacent with the point 810 where the touch input has been detected as well.

In operation 703, the electronic device may identify a direction for rearranging the object from or based on the reference point. For example, the processor 120 may identify the direction for rearranging the object from the reference point based on a predetermined rearrangement form and direction of the object. Additionally or alternatively, the processor 120 may update the predetermined rearrangement direction of the object based on the reference point as well.

In operation 705, the electronic device may determine a priority of the object for rearranging in the rearrangement direction of the object. For example, the processor 120 may set a priority of each object for rearrangement based on at least one of arrangement of the object selectable in the electronic device 101, a name of the object, a use history of the object, or a distance with the reference point. For instance, the distance with the reference point may include a distance between the reference point and the object in the rearrangement direction of the object.

As in operation 707, the electronic device may rearrange the object in consideration of the reference point, based on the arrangement direction of the object and the priority thereof. For example, as in FIG. 8B, the processor 120 may rearrange a region corresponding to the object in a vertically upwards direction from the reference point 810 as denoted by reference numeral 820. For example, as in FIG. 8C, the processor 120 may rearrange the region corresponding to the object in both directions (e.g., a vertically upwards direction and a downwards direction) from the reference point 810 as denoted by reference numeral 830. For example, as in FIG. 8D, the processor 120 may rearrange the region corresponding to the object in three directions (e.g., the upwards direction, the downwards direction and a rightwards direction) from the reference point 810 as denoted by reference numeral 840. Additionally or alternatively, the processor 120 may control the display 260 to display identification information capable of identifying each object in the rearranged region corresponding to the object.

FIGS. 9A to 9D illustrate a configuration for rearranging an object in the form of a curve according to various example embodiments of the present disclosure. In the following description, the electronic device may include the electronic device 101 of FIG. 1 or at least a part (e.g., the processor 120) of the electronic device 101.

Referring to FIG. 9A to FIG. 9D, the electronic device may rearrange an object using a curved format. According to an example embodiment, as in FIG. 9A, the processor 120 may set as a reference a service screen 900 including icons corresponding to an application installed in the electronic device 101. For instance, the processor 120 may set, as a service screen displayable on a display, the service screen 900 including the icons. When detecting a touch input 910 at an upper end of a display region (i.e., a touch panel overlapped with the display region), the processor 120 may arrange a region corresponding to at least one object in the form of a semi-circle in consideration of the touch input 910 as denoted by reference numeral 912. Additionally or alternatively, when an object not disposed within the display region of the display among the rearranged object exists, the processor 120 may display a shift icon 914 capable of indicating the existence of the object not disposed within the display region. When detecting a selection input of the shift icon 914, the processor 120 may change an object disposed in the display region into another object not disposed in the display region. In this case, the processor 120 may control to dispose a predetermined number of objects in sequence in the display region in a direction corresponding to the shift icon 914. For instance, the processor 120 may control the display to display identification information capable of identifying each object in a region corresponding to the rearranged object as well.

Figure 9A:
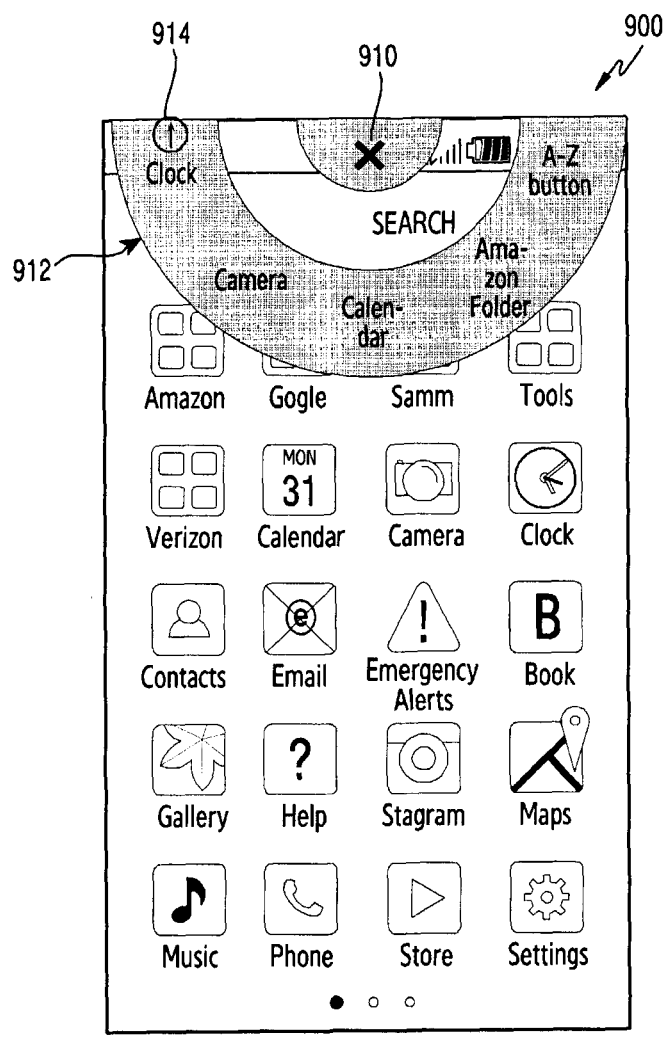
FIG. 9A, FIG. 9B, FIG. 9C and FIG. 9D illustrate a configuration for rearranging an object in the form of a curve according to various example embodiments of the present disclosure.
Figure 9B:
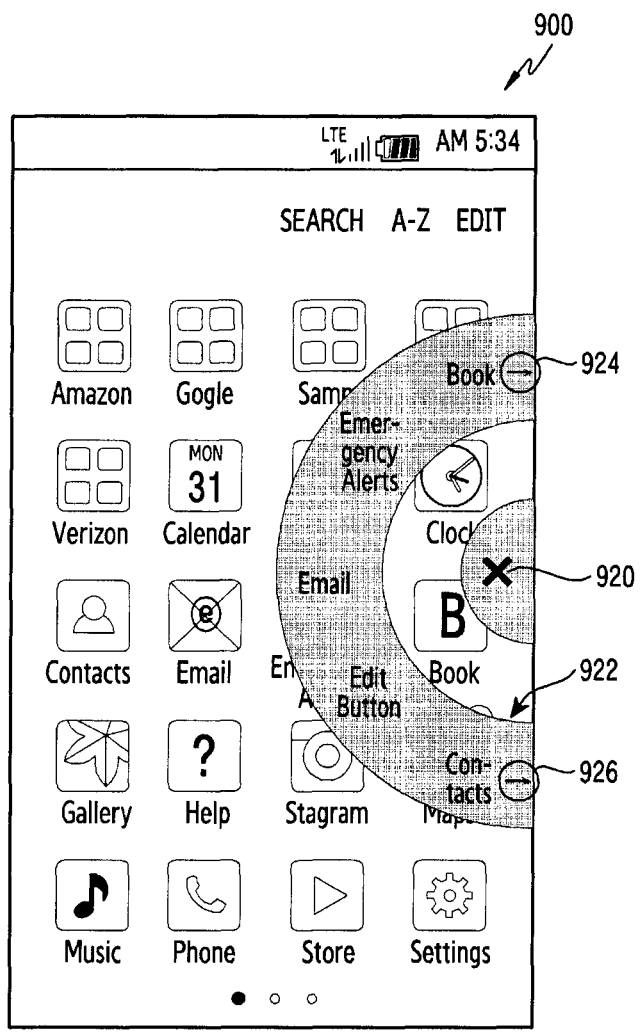

According to an example embodiment, as in FIG. 9B, when detecting a touch input 920 at a right edge of a display region (i.e., a touch panel), the processor 120 may rearrange a region corresponding to at least one object in the form of a semi-circle in consideration of the touch input 920 as denoted by reference numeral 922. Additionally or alternatively, the processor 120 may display shift icons 924 and 926 for shifting an object disposed within the display region to anther object. For instance, the first shift icon 924 and the second shift icon 926 may be set to have different directions for switching an object disposed within the display region to another presently undisplayed object.

Figure 9C:
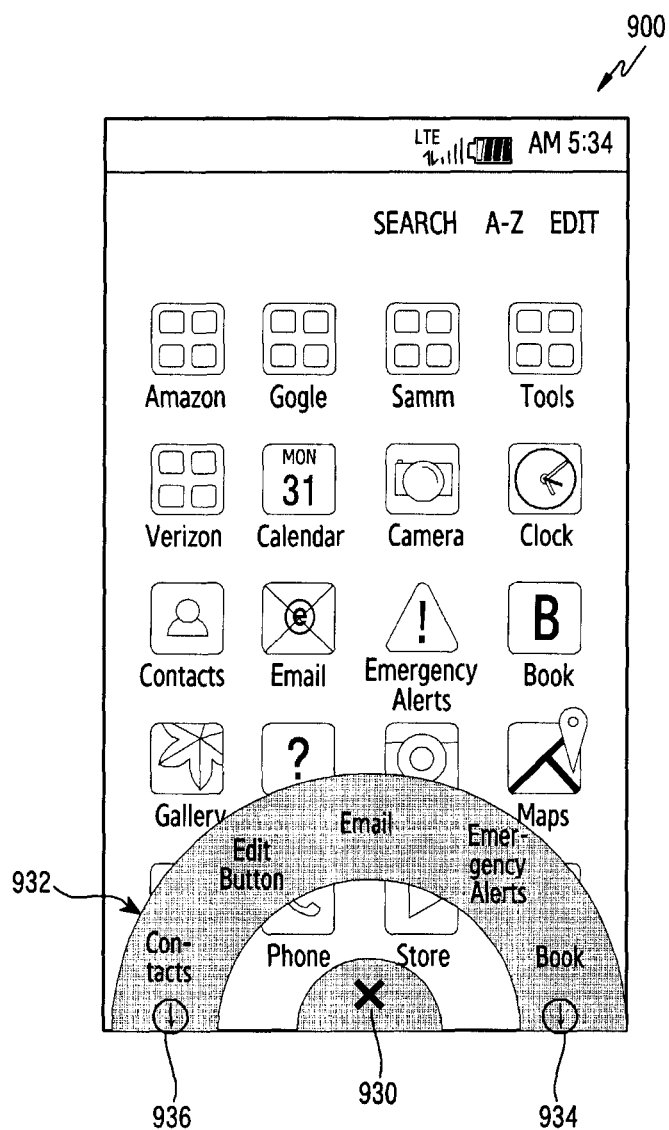

According to an example embodiment, as in FIG. 9C, when detecting a touch input 930 at a lower edge of a display region (i.e., a touch panel), the processor 120 may rearrange a region corresponding to at least one object in the form of a semi-circle in consideration of the touch input 930 as denoted by reference numeral 932. Additionally or alternatively, when displaying identification information capable of identifying a rearranged object on a display electrically connected with the electronic device 101, the processor 120 may display shift icons 934 and 936 for shifting an object displayed on the display to another object. For instance, the processor 120 may control the display to switch at least a part of the rearranged object displayed on the display to another object of the menu that is not initially displayed, based on a selection input of the shift icon 934 or 936.

Figure 9D:
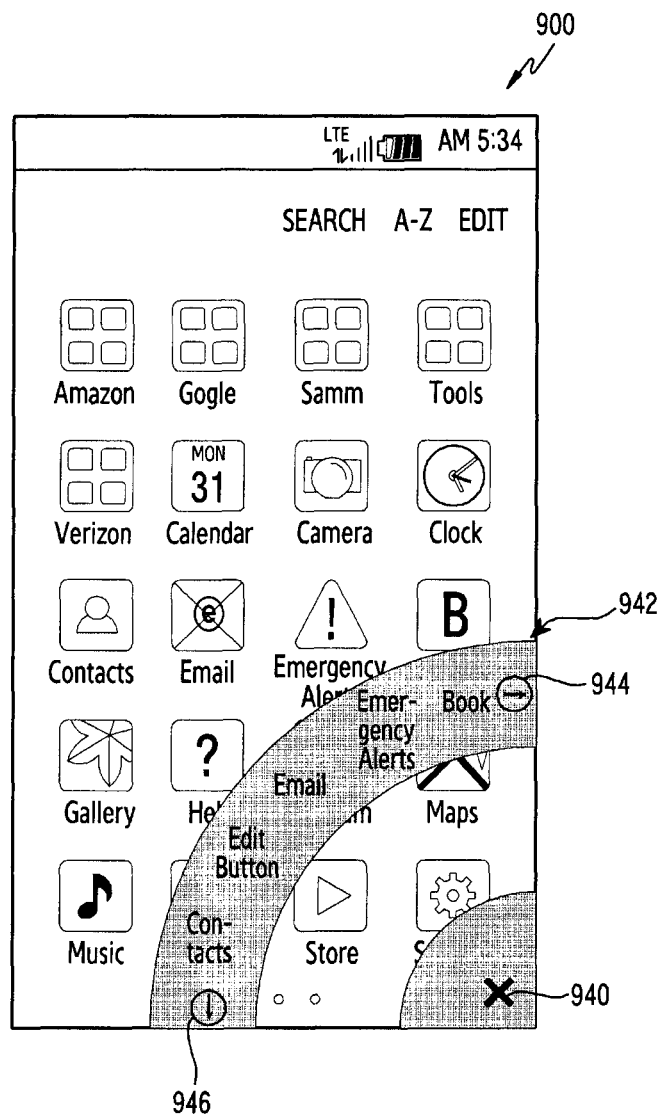

According to an example embodiment, as in FIG. 9D, when detecting a touch input 940 at a corner of a display region (i.e., a touch panel), the processor 120 may rearrange a region corresponding to at least one object in the form of a fan shape with a criterion of the touch input 940 as denoted by reference numeral 942. Additionally or alternatively, the processor 120 may display shift icons 944 and 946 for switching an object disposed within the display region to another presently undisplayed object.

Figure 10A:
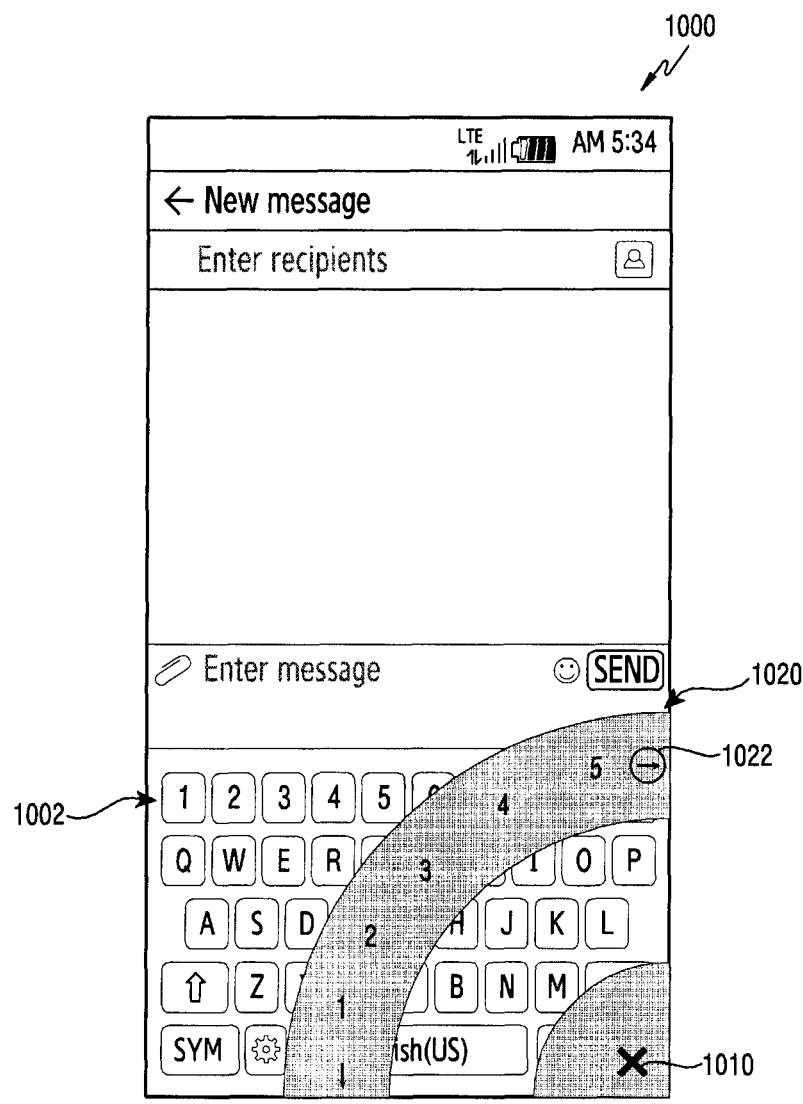
FIG. 10A, FIG. 10B and FIG. 10C illustrate a configuration for rearranging an object of a virtual keypad according to various example embodiments of the present disclosure.
Figure 10B:
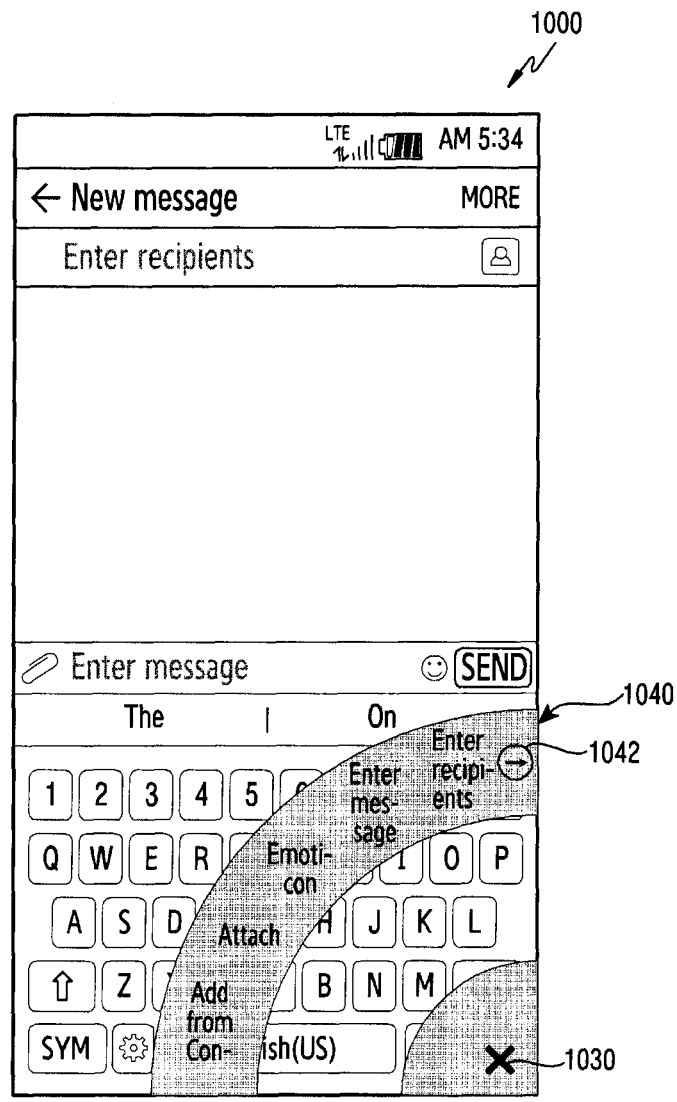
Figure 10C:
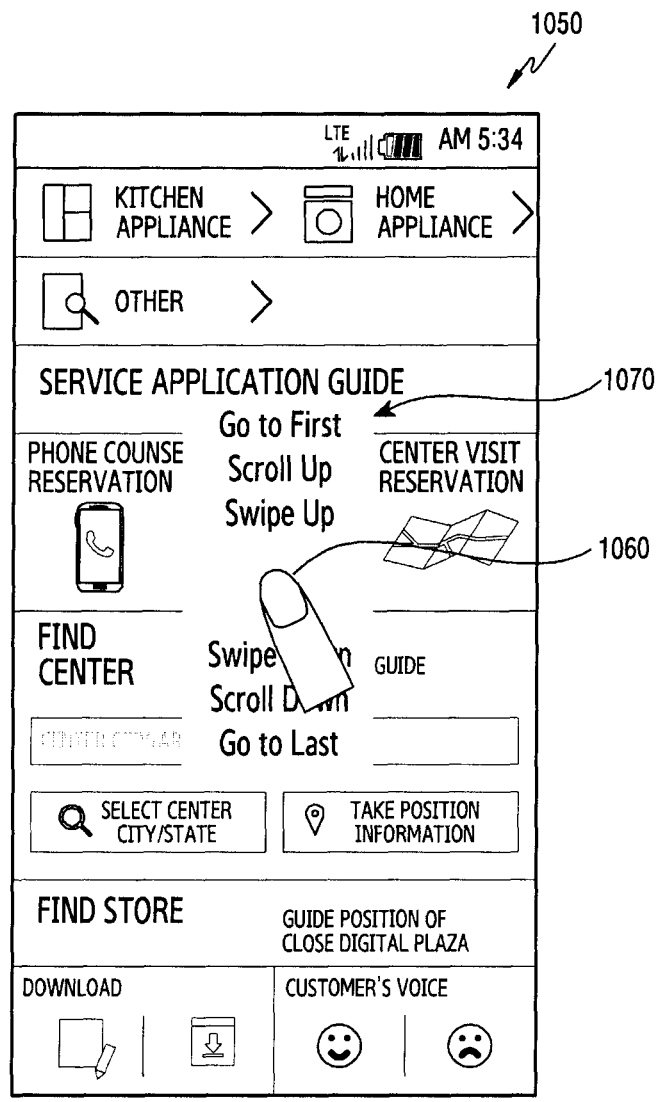

FIGS. 10A to 10C illustrate a configuration for rearranging an object of a virtual keypad according to various example embodiments of the present disclosure. In the following description, the electronic device may include the electronic device 101 of FIG. 1 or at least a part (e.g., the processor 120) of the electronic device 101.

According to an example embodiment, the electronic device may rearrange a numeral or text object included in a virtual keypad. For example, as in FIG. 10A, the processor 120 may control the display to display a virtual keypad 1002 in at least a part of a service screen 1000 of a messenger application. When detecting a touch input 1010 corresponding to an event of object arrangement, the processor 120 may rearrange at least one numeral object into a curved of fanned shape in consideration of the location of the touch input 1010 as denoted by reference numeral 1020. When detecting a selection input of a shift icon 1022, the processor 120 may switch a rearranged numeral object displayed on the display into another numeral object or text object not yet displayed.

According to an example embodiment, the electronic device may rearrange a control function corresponding to a service screen. For example, as in FIG. 10B, when detecting a touch input 1030 corresponding to an event of object arrangement in a state in which a service screen 1000 of a messenger application has been displayed on a display, the processor 120 may detect a control function (e.g., emoticon insertion, recipient setting, etc.) capable of being provided in the service screen 1000 of the messenger application. The processor 120 may rearrange at least one control function in the form of a curved or fan shape in consideration of the touch input 1030 as denoted by reference numeral 1040. When detecting a selection input of a shift icon 1042, the processor 120 may change the rearranged control function displayed on the display into another control function not displayed. For example, as in FIG. 10C, when detecting a touch input 1060 corresponding to an event of object arrangement in a state in which a webpage 1050 has been displayed on a display, the processor 120 may detect a control function (e.g., scrolling, page turning, etc.) capable of being provided in the webpage 1050. The processor 120 may rearrange at least one control function in the form of a column in consideration of a location of the touch input 1060 as denoted by reference numeral 1070.

Figure 11:
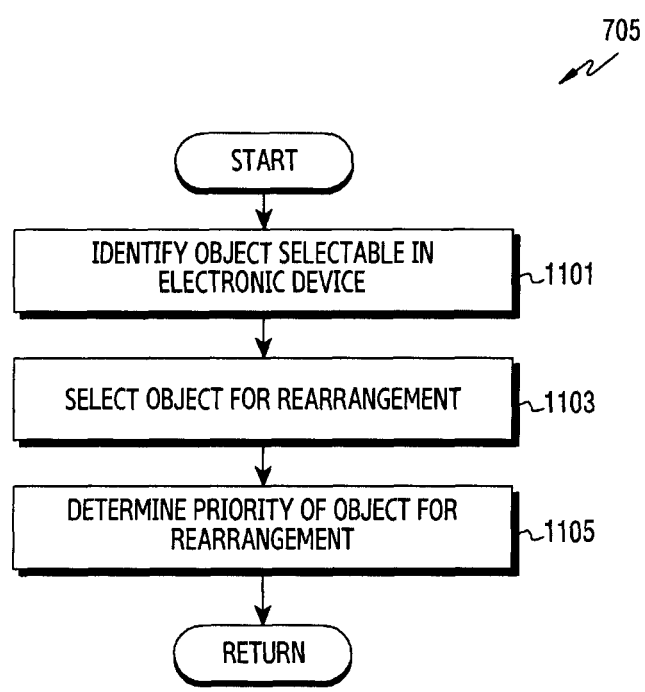
FIG. 11 illustrates a flowchart for setting a priority of an object in an electronic device according to various example embodiments of the present disclosure.

FIG. 11 illustrates a flowchart for setting a priority of an object in an electronic device according to various example embodiments of the present disclosure. The following description is made for an operation for setting the priority of the object in operation 705 of FIG. 7. In the following description, the electronic device may include the electronic device 101 of FIG. 1 or at least a part (e.g., the processor 120) of the electronic device 101.

Referring to FIG. 11, in operation 1101, when determining a reference point for rearranging an object and a rearrangement direction or orientation (e.g., operation 701 to operation 703 of FIG. 7), the electronic device may identify at least one object which is selectable in the electronic device. For example, the processor 120 may identify at least one object information which is selectable in at least one service screen displayable on a display of the electronic device 101.

In operation 1103, the electronic device may select at least one object for rearranging among the at least one object selectable in the electronic device. For example, the processor 120 may identify a use history of the at least one object selectable in the electronic device 101. The processor 120 may select at least one object having a usage history satisfying a reference condition among the at least one object selectable in the electronic device 101. For instance, the use history of the object may include at least one of the number of use of the object, a use time point thereof, or a use time thereof.

In operation 1105, the electronic device may set a priority of the at least one object having been selected for rearrangement. For example, the processor 120 may detect a user's preference for each object based on the use history of the object. The processor 120 may set a priority of each object based on the user's preference. In detail, the processor 120 may set the priority of the object in the order of the high number of times of use. For example, the processor 120 may set the priority of the object having been selected for rearrangement based on at least one of arrangement of the object included in a service screen, a name of the object, or a distance with the reference point.

According to various example embodiments of the present disclosure, the electronic device may select at least one object for rearranging based on the priority of the object determined in operation 705 of FIG. 7. For example, the processor 120 may set the number of objects for rearranging based on at least one of a size of a display region, a position of a reference point, or a use pattern of a user. The processor 120 may select objects of the number for rearranging based on the priority of the at least one object selectable in the electronic device 101.

Figure 12:
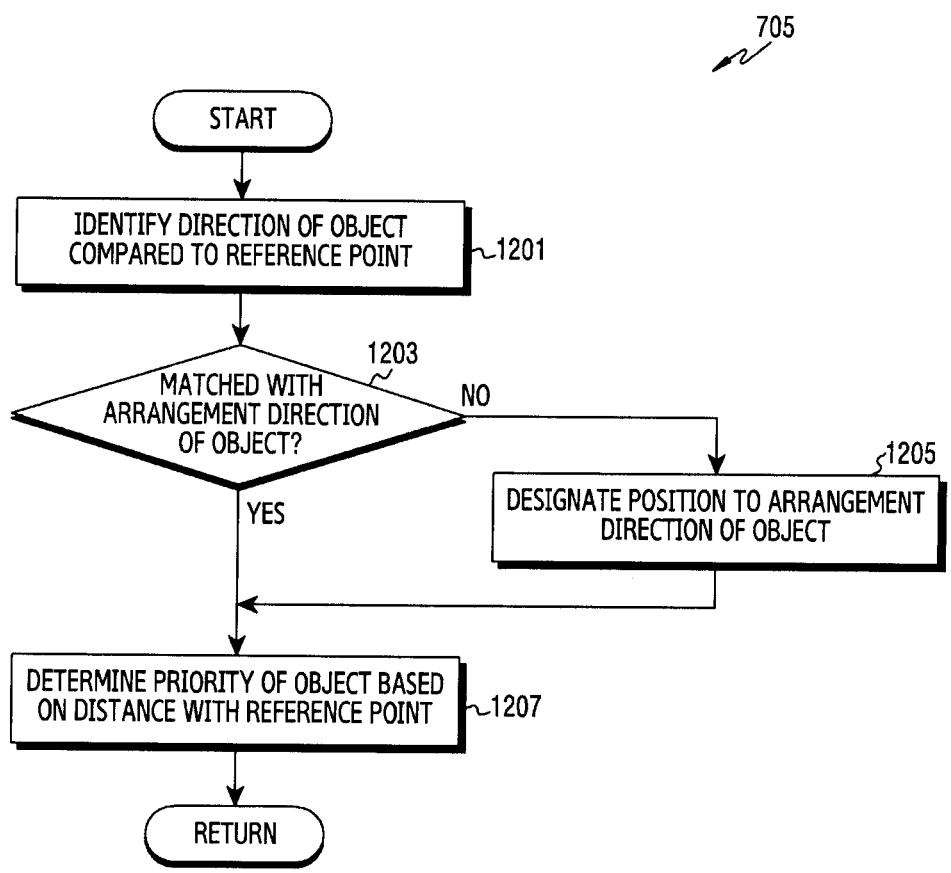
FIG. 12 illustrates a flowchart for setting a priority of an object based on a position of the object in an electronic device according to various example embodiments of the present disclosure.

FIG. 12 illustrates a flowchart for setting a priority of an object based on a position of the object in an electronic device according to various example embodiments of the present disclosure. The following description is made for an operation for setting the priority of the object in operation 705 of FIG. 7. In the following description, the electronic device may include the electronic device 101 of FIG. 1 or at least a part (e.g., the processor 120) of the electronic device 101.

Referring to FIG. 12, in operation 1201, when determining a reference point for rearranging an object and a rearrangement direction (e.g., operation 701 to operation 703 of FIG. 7), the electronic device may identify a direction of each object with a criterion of the reference point for object rearrangement. For example, as in FIG. 8A, when setting a touch point 810 for a display region (i.e., a touch panel) as the reference point, the processor 120 may detect direction information in which each object is positioned from the touch point 810.

In operation 1203, the electronic device may determine whether the direction of the object having been positioned from the reference point matches with an arrangement direction of the object. For example, as in FIG. 8B, when rearranging an object in an upwards direction, the processor 120 may determine that a lock screen object 802 and a data use object 804 having been arranged in the upwards direction with a criterion of the reference point 810 may be matched to the arrangement direction of the object.

In operation 1205, when at least one object not matching with the arrangement direction of the object exists, the electronic device may update a position of the at least one object not matching with the arrangement direction of the object, into the arrangement direction of the object. For example, the processor 120 may virtually update the position of the object into an arrangement direction of an object which is adjacent with the position of the object, but not matching with the arrangement direction of the object. In this case, the processor 120 may determine the position of the object in the arrangement direction of the object based on at least one of a distance between the reference point and the object or a difference between the arrangement direction of the object and a direction of the object positioned from the reference point.

In operation 1207, the electronic device may determine a priority of the object for rearranging based on a distance between the object positioned in the arrangement direction of the object and the reference point. For example, the processor 120 may allocate a relatively high priority to an object having a closer distance with the reference point in the arrangement direction of the object.

Figure 13:
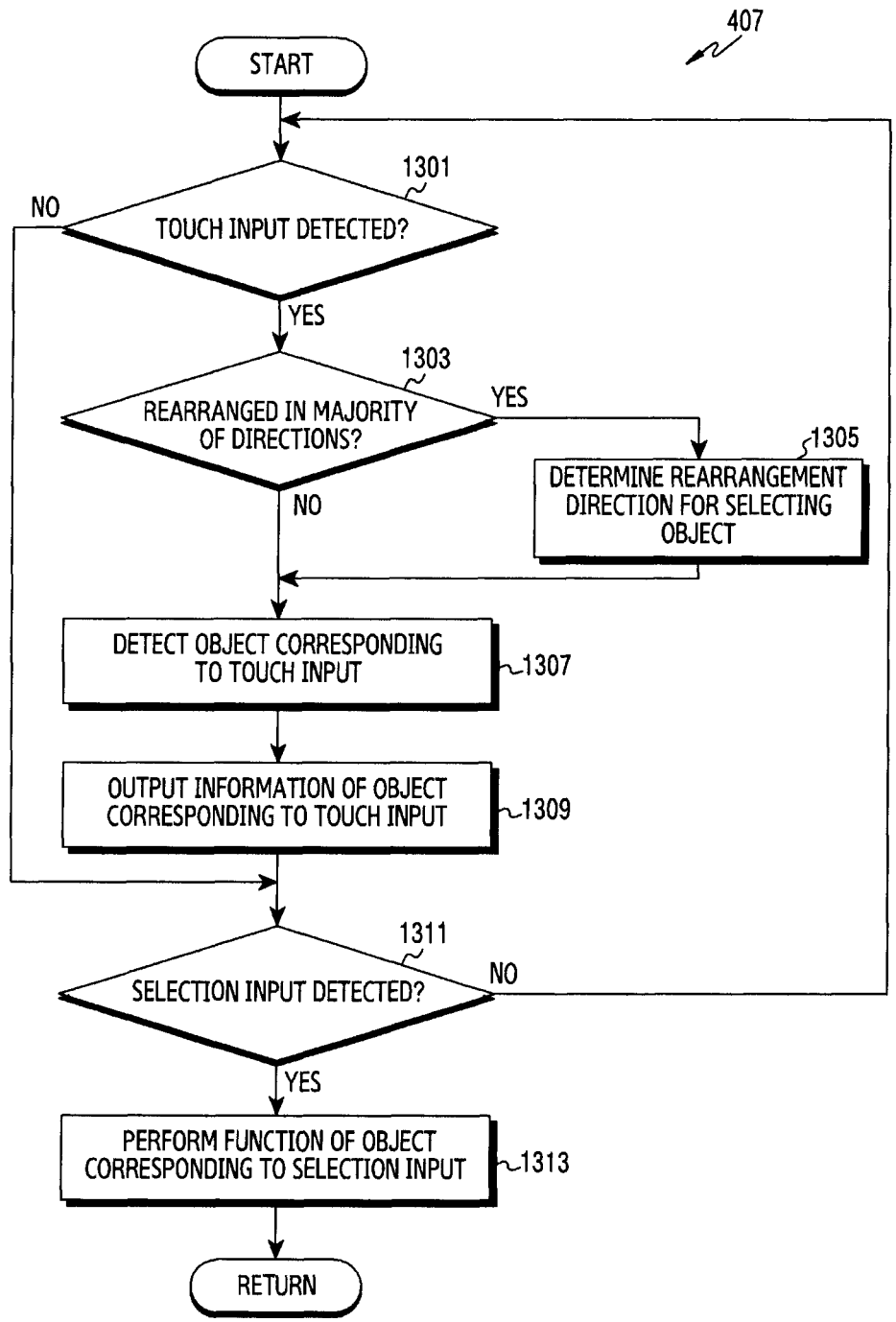
FIG. 13 illustrates a flowchart for outputting object information corresponding to a user input in an electronic device according to various example embodiments of the present disclosure.
Figure 14A:
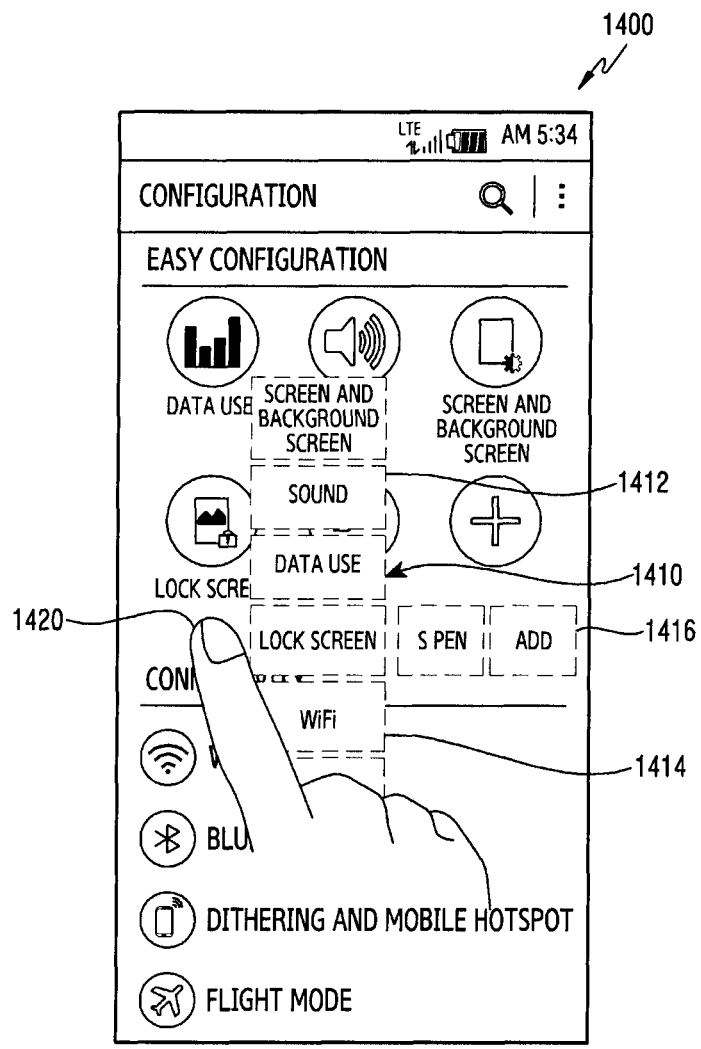
FIG. 14A and FIG. 14B illustrate a configuration for outputting object information based on a user input in an electronic device according to various example embodiments of the present disclosure.
Figure 14B:
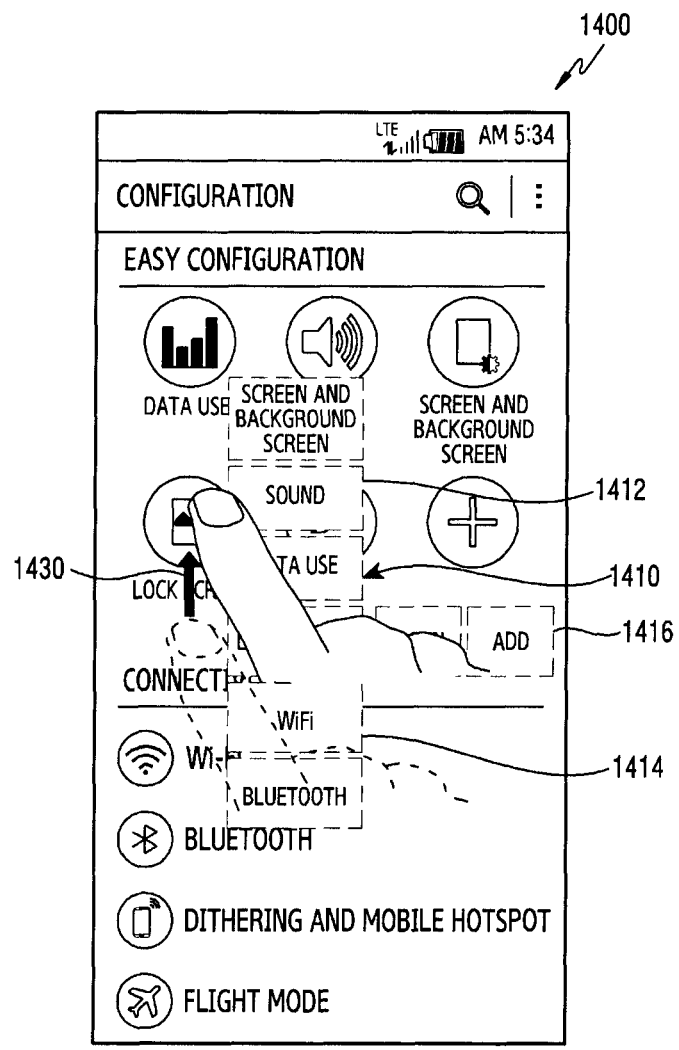

FIG. 13 illustrates a flowchart for outputting object information corresponding to a user input in an electronic device according to various example embodiments of the present disclosure. FIGS. 14A to 14B illustrate a configuration for outputting the object information based on the user input in the electronic device according to various example embodiments of the present disclosure. The following description is given for an operation for outputting the information of the object in operation 407 of FIG. 4. In the following description, the electronic device may include the electronic device 101 of FIG. 1 or at least a part (e.g., the processor 120) of the electronic device 101.

Referring to FIG. 13, in operation 1301, after having rearranged an object (e.g., operation 405 of FIG. 4), the electronic device may determine whether a touch input of the rearranged object is detected. For example, the processor 120 may determine whether an additional touch input different from a touch input corresponding to an event for object arrangement is detected. For example, the processor 120 may determine whether the touch input corresponding to the event for object arrangement is maintained.

In operation 1303, the electronic device may determine whether it has rearranged the object in a plurality of direction. For example, the processor 120 may determine whether there are a plurality of direction in which objects are rearranged. when having rearranged the object in a single direction, the processor 120 may determine the direction in which the object has been rearranged to be a rearrangement direction for selecting the object.

In operation 1305, when having rearranged the object in the plurality of directions, the electronic device may determine a rearrangement direction for selecting the object based on touch information of the rearranged object. For example, when the object has been rearranged in the primary direction, the processor 120 may determine the rearrangement direction for selecting the object based on a movement direction of a touch input. For example, as seen in FIG. 14A, the processor 120 may rearrange at least one object selectable in a service screen 1400 in an upwards direction 1412, a downwards direction 1414, and a rightwards direction 1416 with a criterion of a reference point as denoted by reference numeral 1410. As in FIG. 14A, when detecting a movement of a touch input to the right as denoted by reference numeral 1420, the processor 120 may select the right side direction 1416 in which the object has been rearranged, as a direction for object selection. As in FIG. 14B, when detecting a movement of a touch input in an upwards direction as denoted by reference numeral 1430, the processor 120 may select the upwards direction 1412 in which the object has been rearranged, as the direction for object selection.

In operation 1307, when having rearranged the object in a single direction or determining the rearrangement direction for selecting the object, the electronic device may detect an object corresponding to a touch input in the rearranged direction. For example, the processor 120 may select the object having been arranged in the rearranged direction based on a holding time of a touch input of the rearranged object. In detail, as the touch holding time lapses, the processor 120 may select each object corresponding to a touch holding time in order of the rearranged object. That is, as a user maintains or holds a touch input, a presently selected object within an arrangement or menu of objects may be switched to a next object. Additionally or alternatively, the processor 120 may adjust a selection speed of an object based on at least one of touch release information, touch movement direction information or additional input information (e.g., touch intensity). For example, the processor 120 may select the object having been arranged in the rearranged direction based on a movement distance of a touch input of the rearranged object or the number of times of touch. For example, when a movement of the touch input of the rearranged object is detected, the processor 120 may sequentially select an object of a rearrangement direction corresponding to a touch movement direction to correspond to the number of detection of the movement of the touch input.

In operation 1309, the electronic device may output information of the object corresponding to the touch input so that a user may recognize the information of the object. For example, the processor 120 may control to output, by a sound, the information of the object (e.g., a name of the object) which has been selected based on the touch input in operation 1307. For example, the processor 120 may control to generate a vibration of a pattern corresponding to the information of the object (e.g., the name of the object) which has been selected based on the touch input in operation 1307. Additionally or alternatively, when adjusting a selection speed of an object based on at least one of touch release information, touch movement direction information or additional input information (e.g., touch intensity), the processor 120 may convert a selection of the object into a second object in course of outputting information of a first object as well.

In operation 1311, the electronic device may determine whether a selection input of the object corresponding to the touch input is detected. For example, the processor 120 may determine whether an additional touch input (i.e., user input) for selecting a corresponding object is detected in course of outputting the information of the object corresponding to the touch input.

When the selection input of the object corresponding to the touch input is not detected, in operation 1301, the electronic device may determine whether a touch input for output of the information of the object is detected. For example, the processor 120 may determine whether the touch input capable of selecting the object for outputting the information is maintained.

In operation 1313, when detecting the selection input of the object corresponding to the touch input, the electronic device may perform a function of the object corresponding to the selection input. For example, the processor 120 may execute an application or control function mapped to the object corresponding to the selection input. For example, the processor 120 may the control menu mapped to the object corresponding to the selection input.

According to various example embodiments of the present disclosure, an operation method of an electronic device may include, in response to detecting a first touch input via the touch screen, identifying an orientation for arranging a plurality of selectable objects, rearranging one or more objects from among the plurality of selectable objects arranged based on the identified orientation relative to a location on the touch screen where the first touch input is detected; and outputting information associated with a particular object from among the rearranged one or more objects corresponding to detection of a second touch input.

According to various example embodiments, rearranging the one or more objects further comprises rearranging one or more regions, each region corresponding to each of the rearranged one or more objects, the one or more regions rearranged according to the identified orientation relative to the location.

According to various example embodiments, further comprising: setting a priority for one or more object, wherein the one or more objects are further rearranged according to the set priorities of the objects.

According to various example embodiments, the priority of each of the objects is based on at least one of an arrangement of each object, a name of each object, a usage history for each object, and a distance between the location and each object.

According to various example embodiments, further comprising: detecting an object having a highest priority, and wherein the orientation is identified based on a position of the detected object relative to the location where the first touch input is detected.

According to various example embodiments, the rearrangement comprises a menu in a form of at least one of a column, a row, a curve, a polygon or a circle.

According to various example embodiments, further comprising: in response to detecting holding of the second touch input, switching selection of a present object to a next object within the rearranged one or more objects when a predetermined time lapses; and outputting information associated with the next object.

According to various example embodiments, further comprising: selecting a particular object of the rearranged one or more objects, responsive to detecting movement of the second touch input in a particular direction; and outputting information associated with the selected particular object.

According to various example embodiments, outputting the information associated with the particular object includes output of at least one of a sound and a vibration.

According to various example embodiments, further comprising: in response to detecting the second touch input selecting the particular object, executing a function corresponding to the particular object.

An electronic device and an operation method thereof according to various example embodiments may easily search an object that a user of the electronic device desires, by rearranging a region of an object selectable in an electronic device with a criterion of a user input.

An electronic device and an operation method thereof according to various example embodiments may enhance the efficiency of use of the electronic device for a user who is unavailable for visual recognition, by outputting information of an object based on a sequence of a rearrangement object with a criterion of a user input.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the various embodiments of the present disclosure. Therefore, it should be construed that all modifications and changes or various other embodiments based on the technical idea of various embodiments of the present disclosure fall within the various embodiments of the present disclosure.

What is claimed is:

1. An electronic device comprising:
   at least one processor;
   a touch screen; and
   a memory operatively coupled with the at least one processor, storing instructions executable by the at least one processor to cause the at least one processor to:
   in response to detecting a first touch input via the touch screen, identify an orientation for arranging a plurality of selectable objects, wherein the touch screen displays a page comprising a plurality of icons,
   rearrange one or more objects from among the plurality of selectable objects based on the identified orientation relative to a location on the touch screen where the first touch input is detected, wherein the rearranged one or more objects are displayed in a rearrangement structure overlaying the page and wherein the rearrangement structure displays a shift icon configured to remove at least one of the one or more objects and display another one of the plurality of selectable objects, and
   output information associated with a particular object from among the rearranged one or more objects corresponding to detection of a second touch input, wherein the output information is overlaid onto the page comprising the plurality of icons.

2. The electronic device of claim 1, wherein rearranging the one or more objects further comprise:
   rearranging one or more regions, each region corresponding to each of the rearranged one or more objects, the one or more of regions rearranged according to the identified orientation relative to the location.

3. The electronic device of claim 1, wherein the instructions further comprise setting a priority for each one or more objects, and
   wherein the one or more objects are further rearranged based on the set priorities of the objects.

4. The electronic device of claim 3, wherein the priority of each of the objects is based on at least one of an arrangement of each object, a name of each object, a usage history for each object, and a distance between the location and each object.

5. The electronic device of claim 1, wherein the instructions further comprise detecting an object having a highest priority, and
   wherein the orientation is identified based on a position of the detected object relative to the location where the first touch input is detected.

6. The electronic device of claim 1, wherein the output information comprises a menu in a form of at least one of a column, a row, a curve, a polygon or a circle.

7. The electronic device of claim 1, wherein the instructions further comprise:
in response to detect holding of the second touch input, switching selection of a present object to a next object within the rearranged one or more objects when a predetermined time lapses; and
outputting information associated with the next object.

8. The electronic device of claim 1, wherein the instructions further comprise:
selecting a particular object of the rearranged one or more objects, responsive to detecting movement of the second touch input in a particular direction; and
outputting information associated with the selected particular object.

9. The electronic device of claim 1, wherein outputting the information associated with the particular object includes output of at least one of a sound and a vibration.

10. The electronic device of claim 1, wherein the instructions further comprise:
in response to detecting the second touch input selecting the particular object, executing a function corresponding to the particular object.

11. The electronic device of claim 1, wherein when the location on the touch screen where the first touch input is detected is proximate to an edge, the output information is overlaid onto the page in a semicircular pattern, and wherein when the location is not proximate to an edge, the output is information is overlaid onto the page in a linear pattern.

12. An operation method of an electronic device, comprising:
in response to detecting a first touch input via a touch screen, identifying an orientation for arranging a plurality of selectable objects, wherein the touch screen displays a page comprising a plurality of icons;
rearranging one or more objects from among the plurality of selectable objects based on the identified orientation relative to a location on the touch screen where the first touch input is detected, wherein the rearranged one or more objects are displayed in a rearrangement structure overlaying the page and wherein the rearrangement structure displays a shift icon configured to remove at least one of the one or more objects and display another one of the plurality of selectable objects; and
outputting information associated with a particular object from among the rearranged one or more objects corresponding to detection of a second touch input, wherein the output information is overlaid onto the page comprising the plurality of icons.

13. The method of claim 12, wherein rearranging the one or more objects further comprises rearranging one or more regions, each region corresponding to each of the rearranged one or more objects, the one or more regions rearranged according to the identified orientation relative to the location.

14. The method of claim 12, further comprising:
setting a priority for one or more object,
wherein the one or more objects are further rearranged according to the set priorities of the objects.

15. The method of claim 14, wherein the priority of each of the objects is based on at least one of an arrangement of each object, a name of each object, a usage history for each object, and a distance between the location and each object.

16. The method of claim 12, further comprising:
detecting an object having a highest priority, and
wherein the orientation is identified based on a position of the detected object relative to the location where the first touch input is detected.

17. The method of claim 12, wherein the output information comprises a menu in a form of at least one of a column, a row, a curve, a polygon or a circle.

18. The method of claim 12, further comprising:
in response to detecting holding of the second touch input, switching selection of a present object to a next object within the rearranged one or more objects when a predetermined time lapses; and
outputting information associated with the next object.

19. The method of claim 12, further comprising:
selecting a particular object of the rearranged one or more objects, responsive to detecting movement of the second touch input in a particular direction; and
outputting information associated with the selected particular object.

20. The method of claim 12, wherein outputting the information associated with the particular object includes output of at least one of a sound and a vibration.

21. The method of claim 12, further comprising:
in response to detecting the second touch input selecting the particular object, executing a function corresponding to the particular object.

* * * * *